US010991097B2

(12) United States Patent
Yip et al.

(10) Patent No.: US 10,991,097 B2
(45) Date of Patent: Apr. 27, 2021

(54) ARTIFICIAL INTELLIGENCE SEGMENTATION OF TISSUE IMAGES

(71) Applicant: TEMPUS LABS, INC., Chicago, IL (US)

(72) Inventors: Stephen Yip, Chicago, IL (US); Irvin Ho, Wilmette, IL (US); Lingdao Sha, Chicago, IL (US); Boleslaw Osinski, Chicago, IL (US)

(73) Assignee: TEMPUS LABS, INC., Chicago, IL (US)

( * ) Notice: Subject to any disclaimer, the term of this patent is extended or adjusted under 35 U.S.C. 154(b) by 0 days.

(21) Appl. No.: 16/732,242

(22) Filed: Dec. 31, 2019

(65) Prior Publication Data

US 2020/0211189 A1 Jul. 2, 2020

Related U.S. Application Data

(60) Provisional application No. 62/787,047, filed on Dec. 31, 2018.

(51) Int. Cl.
*G06T 7/00* (2017.01)
*G06T 7/11* (2017.01)

(52) U.S. Cl.
CPC ............ *G06T 7/0012* (2013.01); *G06T 7/11* (2017.01); *G06T 2207/30024* (2013.01); *G06T 2207/30096* (2013.01)

(58) Field of Classification Search
CPC ......... G06T 7/0012; G06T 2207/30096; G06T 2207/20084; G06K 9/00147; G06K 9/00523; G06K 9/00536; G06N 20/00
See application file for complete search history.

(56) References Cited

U.S. PATENT DOCUMENTS

| 6,463,438 B1 | 10/2002 | Veltri et al. |
| 9,996,664 B2 | 6/2018 | Lloyd et al. |

(Continued)

FOREIGN PATENT DOCUMENTS

| CN | 107369151 A | 11/2017 |
| WO | 2017/198790 A1 | 11/2017 |

(Continued)

OTHER PUBLICATIONS

"John Hopkins University Study Finds Laboratory-Developed Liquid Biopsy Tets Can Give Different Results; Call for 'Improved Certification' of Medical Laboratories That Develop These LDTs", Dark Daily, 6 pages (2018).

(Continued)

*Primary Examiner* — Ross Varndell
(74) *Attorney, Agent, or Firm* — Marshall, Gerstein & Borun LLP

(57) ABSTRACT

Techniques for generating an overlay map on a digital medical image of a slide are provided, and include cell detection and tissue classification processes. Techniques include receiving a medical image, separating the image into tiles, and performing tile classifications and tissue classifications based on a multi-tile analysis. Techniques additionally include identifying cell objects in the image, separating the image into and displaying polygons identifying the cell objects and cell classifications. Generated displays may be overlays over the initial digital image.

18 Claims, 16 Drawing Sheets
(14 of 16 Drawing Sheet(s) Filed in Color)

(56) References Cited

U.S. PATENT DOCUMENTS

| | | | |
|---|---|---|---|
| 10,426,442 B1* | 10/2019 | Schnorr | A61B 8/0866 |
| 10,699,163 B1* | 6/2020 | Shah | G06K 9/627 |
| 2003/0215936 A1 | 11/2003 | Kallioniemi et al. | |
| 2006/0064248 A1 | 3/2006 | Saidi et al. | |
| 2007/0216909 A1* | 9/2007 | Everett | A61B 5/0059 |
| | | | 356/479 |
| 2010/0111396 A1 | 5/2010 | Boucheron | |
| 2011/0188728 A1 | 8/2011 | Sammak et al. | |
| 2014/0073922 A1* | 3/2014 | Mammone | A61B 8/5223 |
| | | | 600/440 |
| 2014/0140607 A1* | 5/2014 | Erjefalt | G06K 9/0014 |
| | | | 382/133 |
| 2014/0337052 A1* | 11/2014 | Pellini | G16H 15/00 |
| | | | 705/3 |
| 2015/0100246 A1 | 4/2015 | Remzi et al. | |
| 2016/0063724 A1* | 3/2016 | Tunstall | G06K 9/4642 |
| | | | 382/128 |
| 2016/0103973 A1 | 4/2016 | Singal et al. | |
| 2016/0217253 A1 | 7/2016 | Newman et al. | |
| 2016/0253466 A1 | 9/2016 | Agaian et al. | |
| 2017/0076046 A1 | 3/2017 | Barnes et al. | |
| 2017/0076442 A1* | 3/2017 | Schoenmeyer | G16H 30/40 |
| 2017/0337682 A1 | 11/2017 | Liao et al. | |
| 2018/0005136 A1 | 1/2018 | Gai et al. | |
| 2018/0089373 A1* | 3/2018 | Matsuguchi | G16H 70/20 |
| 2018/0121759 A1 | 5/2018 | Gabrani et al. | |
| 2018/0129911 A1 | 5/2018 | Madabhushi et al. | |
| 2018/0137394 A1* | 5/2018 | Wenzel | A61B 5/055 |
| 2018/0239949 A1 | 8/2018 | Chander et al. | |
| 2018/0340870 A1 | 11/2018 | Gustafson et al. | |
| 2019/0034591 A1 | 1/2019 | Mossin et al. | |
| 2019/0043242 A1* | 2/2019 | Risser | G06K 9/6202 |
| 2019/0087532 A1 | 3/2019 | Madabhushi et al. | |
| 2019/0169685 A1 | 6/2019 | Georgiadis et al. | |
| 2019/0392580 A1* | 12/2019 | Kapil | G06T 7/0012 |
| 2020/0105417 A1* | 4/2020 | Dolan | G06Q 40/08 |

FOREIGN PATENT DOCUMENTS

| | | |
|---|---|---|
| WO | 2018/065434 A1 | 4/2018 |
| WO | 2018/067937 A1 | 4/2018 |
| WO | 2018/136664 A1 | 7/2018 |
| WO | 2018/165103 A1 | 9/2018 |

OTHER PUBLICATIONS

"Technical Specifications," FoundationOne (Registered) Liquid, Foundation Medicine, Inc. (2018).

Abdel-Rahman, Correlation between PD-L1 expression and outcome of NSCLC patients treated with anti-PD-1/PD-L1 agents: a meta-analysis, Crit. Rev. Oncol. Hematol., 101:75-85 (2016).

Abels et al., Current state of the regulatory trajectory for whole slide imaging devices in the USA, Journal of Pathology Informatics, 1:23 (2017).

Aderi, Pathology services in developing countries—the West African experience, Arch. Pathol. Lab. Med., 135:183-6 (2011).

Aerts et al., Decoding tumour phenotype by noninvasive imaging using a quantitative radiomics approach, Nat. Commun., 5:4006 (2014).

Ash et al., Joint analysis of gene expression levels and histological images identifies genes associated with tissue morphology, 1-28 (2018).

Ayers et al., IFN-g-related mRNA profile predicts clinical response to PD-1 blockade, The Journal of Clinical Investigation, 127(8):2930-2940 (2017).

Baas et al., Relationship between level of PD-L1 expression and outcomes in the KEYNOTE-010 study of pembrolizumab vs docetaxel for previously treated, PD-L1-Positive NSCLC., J. Clin. Orthod. American Society of Clinical Oncology, 34:9015-9015 (2016).

Bandi et al., From detection of individual metastases to classification of lymph node status at the patient level: the CAMELYON17 challenge, IEEE Transactions on Medical Imaging, 38:550-560 (2019).

Bankhead et al., QuPath: Open source software for digital pathology image analysis, Sci. Rep., 7:16878 (2017).

Beaubier et al., Clinical validation of the tempus xT next-generation targeted oncology sequencing assay, Oncotarget, 10:2384-2396 (2019).

Bejnordi et al., Diagnostic assessment of deep learning algorithms for detection of lymph node metastases in women with breast cancer, JAMA, 318:2199-2210 (2017).

Bergado et al., Recurrent multiresolution convolutional networks for vhr image classification, (2018), <Downloaded from the Internet https://arxiv.org/pdf/1806.05793.pdf > <Downloaded on: Mar. 15, 2020> < DOI: 10.1109/TGRS.2018.2837357> entire document, especially.

Borghaei et al., Nivolumab versus docetaxel in advanced nonsquamous non-small-cell lung cancer, N. Engl. J. Med., 373:1627-39 (2015).

Brahmer et al., Safety and activity of anti-PD-L1 antibody in patients with advanced cancer, N. Engl. J. Med., 366:2455-65 (2012).

Bray et al., Global cancer statistics 2018: GLOBOCAN estimates of incidence and mortality worldwide for 36 cancers in 185 countries, CA Cancer J. Clin., 68:394-424 (2018).

Brugnara et al., Management training for pathology residents: i. results of a national survey, American journal of clinical pathology, 101:559-563 (1994).

Bunescu et al., Multiple instance learning for sparse positive bags, Proceedings of the 24th Annual Intl. Conf. on Machine Learning (ICML-2007).

Buttner et al., Programmed death-ligand 1 immunohistochemistry testing: A review of analytical assays and clinical implementation in non-small-cell lung cancer, J. Clin. Oncol., 35:3867-76 (2017).

Bychkov et al., Deep learning for tissue microarray image-based outcome prediction in patients with colorectal cancer, Proc. of SPIE, 9791:979115 (2016).

Campanella et al., Clinical-grade computational pathology using weakly supervised deep learning on whole slide images, Nature Medicine, 25:1301-1309 (2019).

Caravagna et al., Algorithimic methods to infer the evolutionary trajectories in cancer progression, PNAS., 113(28):E4025-E4034 (2016).

Cardiff et al., Manual hematoxylin and eosin staining of mouse tissue sections, Cold Spring Harb Protoc., 655-8 (2014).

Carter et al., Absolute quantification of somatic DNA alterations in human cancer, Nat. Biotechnol., 30:413-421 (2012).

Chang, Chemotherapy, chemoresistance and the changing treatment landscape for NSCLC, Lung Cancer, 71:3-10 (2011).

Clark et al., Analytical validation of a hybrid capture—based next-generation sequencing clinical assay for genomic profiling of cell-free circulating tumorDNA, The Journal of Molecular Diagnostics, 20(5):686-702 (2018).

Clunie, HIMA_2017_DICOMWSI_Clunie [PowerPoint slides]. Retrieved from https://www.dclunie.com/papers/HTMA_2017_DICOMWSI_Clunie.pdf, (2017).

Cooper et al., PanCancer insights from the cancer genome atlas: the pathologist's perspective, J. Pathol., 244:512-524 (2018).

Cortes-Ciriano et al., A molecular portrait of microsatellite instability across multiple cancers, Nat. Commun., 8:12 (2017).

Coudray et al., Classification and mutation prediction from non-small cell lung cancer histopathology images using deep learning, bioRxiv, 23 (2017).

Couture et al., Image analysis with deep learning to predict breast cancer grade, ER status, histologic subtype, and intrinsic subtype, NPJ. Breast Cancer, 4:30 (2018).

Cruz-Roa et al., Accurate and reproducible invasive breast cancer detection in whole-slide images: A Deep Learning approach for quantifying tumor extent, Scientific Reports, 7:46450, 14 (2017).

D'Incecco et al., PD-1 and PD-L1 expression in molecularly selected non-small-cell lung cancer patients, Br. J. Cancer, 112:95-102 (2015).

Daume et al., Domain adaptation for statistical classifiers, Journal of Artificial Intelligence Research, 26:101-126 (2006).

(56) References Cited

OTHER PUBLICATIONS

Denkert et al., Standardized evaluation of tumor-infiltrating lymphocytes in breast cancer: results of the ring studies of the international immuno-oncology biomarker working group, Mod. Pathol., 29:1155-64 (2016).
Dienstmann et al., Consensus molecular subtypes and the evolution of precision medicine in colorectal cancer, Nat. Rev. Cancer, 17:14 (2017).
Ertosun et al., Automated grading of gliomas using deep learning in digital pathology images: A modular approach with ensemble of convolutional neural networks, AMIA. Annu. Symp. Proceedings AMIA. Symp., 1899-908 (2015).
Esteva et al., Dermatologist-level classification of skin cancer with deep neural networks, Nature, 542:115-118 (2017).
Evaluation of Automatic Class III Designation for MSK-Impact (Integrated Mutation Profiling of Actionable Cancer Targets), Decision Summary, 57 pp. (publicly available before May 14, 2018).
Fabrizio et al., Beyond microsatellite testing: assessment of tumor mutational burden identifies subsets of colorectal cancer who may respond to immune checkpoint inhibition, Journal of Gastrointestinal Oncology, 9(4):610-617 (2018).
Feldman et al., Tissue processing and hematoxylin and eosin staining, Methods Mol. Biol., 1180:31-43 (2014).
FoundationOne CDx (Trademark) Technical Information, Foundation Medicine, Inc., Cambridge, Massachusetts, 43 pp. (Nov. 2017).
FoundationOne Liquid, Genomic Testing 6 pages (2019).
Gan et al., Applicability of Next generation sequencing technology in microsatellite instabilty testing, Genes, 6:46-59 (2015).
Ganin et al., Domain-adversarial training of neural networks, The journal of machine learning research, 17:2096-2030 (2016).
Garg et al., Patterns of locoregional failure in stage III non-small cell lung cancer treated with definitive chemoradiation therapy, Pract. Radiat. Oncol., 4:342-8 (2014).
Gertych et al., Convolutional neural networks can accurately distinguish four histologic growth patterns of lung adenocarcinoma in digital slides, Sci. Rep., nature.com, 9:1483 (2019).
GitHub, "HistomicsTK", available online at <https://github.com/DigitalSlideArchive/HistomicsTK>, retrieved on Apr. 17, 2020, 3 pages.
Grossman et al., Toward a shared vision for cancer genomic data, The New England Journal of Medicine, 375:1109-1112 (2016).
Grossmann et al., Defining the biological basis of radiomic phenotypes in lung cancer, Elife, 6:e23421 (2017).
Gutman et al., The digital slide archive: a software platform for management, integration, and analysis of histology for cancer research, Cancer Research, 77:e75-e78 (2017).
Hause et al., Classification and characterization of microsatellite instability across 18 cancer types, Nature Medicine, 22:1342-1350 (2016).
He et al., Deep residual learning for image recognition, Proceedings of the IEEE conference on computer vision and pattern recognition, 770-778 (2016).
Heindl et al., Microenvironmental niche divergence shapes BRCA1-dysregulated ovarian cancer morphological plasticity, Nat. Commun., (2018), doi:10.1038/s41467-018-06130-3.
Herbst et al., Pembrolizumab versus docetaxel for previously treated, PD-L1-positive, advanced non-small-cell lung cancer (KEYNOTE-010): a randomised controlled trial Lancet, 387:1540-50 (2016).
Herbst et al., Predictive correlates of response to the anti-PD-L1 antibody MPDL3280A in cancer patients, Nature, 515:563-7 (2014).
Ilse et al., Attention-based deep multiple instance learning, Proceedings of the 35th International Conference on Machine Learning, PMLR 80:2127-2136 (2018).
Ing et al., A novel machine learning approach reveals latent vascular phenotypes predictive of renal cancer outcome, Sci. Rep., 7:13190 (2017).
International Application No. PCT/US2019/032313, International Search Report and Written Opinion, dated Jul. 26, 2019.
International Application No. PCT/US2019/069164, International Search Report and Written Opinion, dated Apr. 9, 2020.

Ioffe et al., Batch normalization: Accelerating deep network training by reducing internal covariate shift [Internet], arXiv [cs.LG], (2015), Available from: http://arxiv.org/abs/1502.03167.
Janowczyk et al., Deep learning for digital pathology imageanalysis: A comprehensive tutorial with selected use cases, J. Pathol. Inform., 7:29 (2016).
Janzic et al., PD-L1 Expression in Squamous-cell Carcinoma and Adenocarcinoma of the lung, Radiol. Oncol., 51:357-62 (2017).
Kapil et al., Deep semi supervised generative learning for automated PD-L1 tumor cell scoring on NSCLC tissue needle biopsies, 1-10 (2018).
Kather et al., Deep learning can predict microsatellite instability directly from histology in gastrointestinal cancer, Nat. Med., 25:1054-1054 (2019).
Kather et al., Predicting survival from colorectal cancer histology slides using deep learning: A retrospective multicenter study, PLoS medicine 16:e1002730 (2019).
Kazandjian et al., FDA approval summary: Nivolumab for the treatment of metastatic non-small cell lung cancer with progression on or after platinum-based chemotherapy, Oncologist., 21:634-42 (2016).
Kerr et al., Programmed death ligand-1 immunohistochemistry: Friend or foe?, Arch. Pathol. Lab. Med., 140:326-31 (2016).
Kim et al., The landscape of microsatellite instability in colorectal and endometrial cancer genomes, Cell, 155(4):21 (2013).
Kitano et al., Tumour-infiltrating lymphocytes are correlated with higher expression levels of PD-1 and PD-L1 in early breast cancer, ESMO Open, 2:e000150 (2017).
Komura et al., Machine learning methods for histopathological image analysis, Comput. Struct. Biotechnol. J., 16:34-42 (2018).
Kristensen et al., Principles and methods of integrative genomic analyses in cancer, Nat. Rev., 14:299-313 (2014).
Krupinski et al., A new software platform to improve multidisciplinary tumor board workflows and user satisfaction: A pilot study, J. Pathol. Inform., 9:26 (2018).
Kurakin et al., Adversarial Examples in the Physical World, Technical report, (2016).
Lan et al., Quantitative histology analysis of the ovarian tumour microenvironment, Sci. Rep., 5:16317 (2015).
Lecun et al., Deep learning, Nature, 521:436-444 (2015).
Leek et al., Association of macrophage infiltration with angiogenesis and prognosis in invasive breast carcinoma, Cancer Res., 56:4625-9 (1996).
Lemery et al., First FDA approval agnostic of cancer site—when a biomarker defines the indication, N. Engl. J. Med., 377:1409-1412 (2017).
Levenson et al., Pigeons (Columba livia) as trainable observers of pathology and radiology breast cancer images, PLoS One, 10:e0141357 (2015).
Levine et al., Rise of the machines: Advances in deep learning for cancer diagnosis, Trends in Cancer, 5(3):157-169 (2019).
Litjens et al., A survey on deep learning in medical image analysis, Med. Image Anal. Elsevier, 42:60-88 (2017).
Litjens et al., Deep learning as a tool for increased accuracy and efficiency of histopathological diagnosis, Sci. Rep. Nature.com, 6:26286 (2016).
Liu et al., Artificial intelligence-based breast cancer nodal metastasis detection, Arch. Pathol. Lab. Med. arpa., 2018-0147-OA (2018). doi:10.5858/arpa.2018-0147-OA.
Liu et al., Detecting cancer metastases on gigapixel pathology images, 13 (2017).
Long et al., Fully convolutional networks for semantic segmentation, IEEE Transactions on Pattern Analysis and Machine Intelligence, 39:640-651 (2017), https://ieeexplore.ieee.org/document/7298965.
Lowe, Distinctive image features from scale-invariant keypoints, Int. J. Computer Vision, 28 (2004).
Luo et al., Comprehensive computational pathological image analysis predicts lung cancer prognosis, J. Thorac. Oncol., 12:501-509 (2017).
Madabhushi et al., Image analysis and machine learning in digital pathology: Challenges and opportunities, Med. Image Anal., 33:170-175 (2016).

(56) References Cited

OTHER PUBLICATIONS

McLaughlin et al., Quantitative assessment of the heterogeneity of PD-L1 expression in non-small-cell lung cancer, JAMA Oncol. American Medical Association, 2:46-54 (2016).

Meng et al., Predictive biomarkers in PD-1/PD-L1 checkpoint blockade immunotherapy, Cancer Treat. Rev., 41:868-76 (2015).

Mobadersany et al., Predicting cancer outcomes from histology and genomics using convolutional networks, Proc. Natl. Acad. Sci. U. S. A., 115:E2970-9 (2018).

Murphy et al., Comparison of the microsatellite instability analysis system and the bethesda panel for the determination of microsatellite instability in colorectal cancers, Journal of Molecular Diagnostics, 8(3):305-311 (2006).

Nalisnik et al., Interactive phenotyping of large-scale histology imaging data with HistomicsML, Sci. Rep., 1-12 (2017).

Nawaz et al., Beyond immune density: critical role of spatial heterogeneity in oestrogen receptor-negative breast cancer, doi:10.1038/modpathol., 37 (2015).

Newburn, Understanding the role of Human Leukocyte Antigen in Cancer Immunotherapy, Personalis, (2019).

O'Rourke et al., Is concurrent chemoradiation the standard of care for locally advanced non-small cell lung cancer?, A review of guidelines and evidence, Clin. Oncol., 22:347-55 (2010).

OpenSeadragon API: Getting Started, available online at <https://openseadragon.github.io/docs/>, 3 (2020).

Orange et al., Identification of three rheumatoid arthritis disease subtypes by machine learning integration of synovial histologic features and RNA sequencing data, Arthritis Rheumatol., 70:690-701 (2018).

Pardoll, The blockade of immune checkpoints in cancer immunotherapy, Nat. Rev. Cancer, 12:252-264 (2012).

Patel et al., Development of immunohistochemistry services for cancer care in western Kenya: Implications for low-and middle-income countries, S. Afr. J. Lab. Clin. Med., 5:187 ( 2016).

Patel et al., PD-L1 expression as a predictive biomarker in cancer immunotherapy, Mol. Cancer Ther., 14:847-56 (2015).

PMA P170019: FDA Summary of Safety and Effectiveness of Data, FoundationOne CDx (Trademark), 58 pp. (Nov. 30, 2017).

Popovici et al., Image-based surrogate biomarkers for molecular subtypes of colorectal cancer, Bioinformatics, 33(13):2002-2009 (2017).

Press Release—Guardant Health Presents Data on Immunotherapy-related Biomarkers MSI and TMB in blood of advanced cancer patients at European Society of Medical Oncology Annual Meeting, 4 pages, (2018).

Ratcliffe et al., Agreement between programmed cell death ligand-1 diagnostic assays across multiple protein expression cutoffs in non-small cell lung cancer. Clin. Cancer Res., 23:3585-91 (2017).

Rimm et al., A prospective, Multi-institutional, Pathologist-based assessment of 4 immunohistochemistry assays for PD-L1 expression in non-small cell lung cancer, JAMA. Oncol., 3:1051-8 (2017).

Rivenson et al., Deep learning-based virtual histology staining using auto-fluorescence of label-free tissue, Nat. Biomed. Eng., (2019).

Roach et al., Development of a companion diagnostic PD-L1 immunohistochemistry assay for pembrolizumab therapy in non-small-cell lung cancer, Appl. Immunohistochem. Mol. Morphol., 24:392-7 (2016).

Roche Molecular Systems, Inc., NAVIFY Tumor Board, available online at <https://www.navify.com/tumorboard/>, retrieved on 9 (2020).

Ronneberger et al., U-Net: Convolutional networks for biomedical image segmentation, arXiv:1505.04597 [cs] (2015), https://arxiv.org/abs/1505.04597.

Russakovsky et al., ImageNet large scale visual recognition challenge [Internet], arXiv [cs.CV], (2014), Available from: http://arxiv.org/abs/1409.0575.

Saltz et al., Spatial organization and molecular correlation of tumor-infiltrating lymphocytes using deep learning on pathology images, Cell Reports, 23:181-193 (2018).

Schaumberg et al., H&E-stained whole slide image deep learning predicts SPOP mutation state in prostate cancer [Internet], bioRxiv, [cited Feb. 13, 2019], 064279 (2018), Available from: https://www.biorxiv.org/content/10.1101/064279v9.

Schmidhuber, Deep learning in neural networks: an overview, Neural Netw. Elsevier, 61:85-117 (2015).

Simonyan et al., Very deep convolutional networks for large-scale image recognition, 10 (2014).

Springenberg et al., Striving for simplicity: The All Convolutional Net., ICLR (2014).

Sul et al., FDA approval summary: Pembrolizumab for the treatment of patients with metastatic non-small cell lung cancer whose tumors express programmed death-ligand 1, Oncologist., 21:643-50 (2016).

Sundar et al., Nivolumab in NSCLC: latest evidence and clinical potential, Ther. Adv. Med. Oncol., 7:85-96 (2015).

Szegedy et al., Going deeper with convolutions, IEEE, 9 (2015).

Teng et al., Classifying cancers based on T-cell infiltration and PD-L1, Cancer Res., 75:2139-45 (2015).

Thorsson et al, The immune landscape of cancer, Immunity, 48:812-830 (2018).

Thrane et al., Spatially resolved transcriptomics enables dissection of genetic heterogeneity in stage III cutaneous malignant melanoma, Cancer Res., 78(20):5970-5979, (2018).

Tizhoosh et al., Artificial intelligence and digital pathology: Challenges and opportunities, J. Pathol. Inform, 9:38 (2018).

Tsujikawa et al., Quantitative multiplex immunohistochemistry reveals myeloid-inflamed tumor-immune complexity associated with poor prognosis. Cell Reports, 19:203-217 (2017).

Tzeng et al,. Adversarial discriminative domain adaptation, Proceedings of the IEEE Conference on Computer Vision and Pattern Recognition, 7167-7176 (2017).

U.S. Food & Drug Administration (FDA), KEYTRUDA label [Internet], [cited Last accessed Feb 12, 2019], Available from: https://www.accessdata.fda.gov/drugsaffda_docs/label/2017/125514s024lbl.pdf#page=46.

U.S. Food & Drug Administration (FDA), PD-L1 IHC 22C3 pharmDx. Summary of Safety and Effectiveness Data [Internet], [cited Last accessed Feb 12, 2019], Available from: https://www.accessdata.fda.gov/cdrh_docs/pdf15/P150013S006b.pdf.

U.S. Food & Drug Administration, Letter of Review of FoundationOne CDx (Trademark), 5 pp. (Nov. 30, 2017).

Umar et al., Revised bethesda guidelines for hereditary nonpolyposis colorectal cancer (lynch syndrome) and microsatellite instability, Journal of the National Cancer Institute, 96:261-268 (2004).

University Hospital of Liége and Osimis S.A., Rest API of Orthanc, available online at <https://book.orthanc-server.com/users/rest.html#>, 17 (2015).

Vasconcelos et al., Increasing deep learning melanoma classification by classical and expert knowledge based image transforms, CoRR, (2017).

Vassilakopoulou et al., Evaluation of PD-L1 expression and associated tumor-infiltrating lymphocytes in laryngeal squamous cell carcinoma, Clin. Cancer Res., 22:704-13 (2016).

Velcheti et al., Programmed death ligand-1 expression in non-small cell lung cancer, Lab. Invest., 94:107-16 (2014).

Vilar et al., Microsatellite instability in colorectal cancer—the stable evidence, Nat. Rev. Clin. Oncol., 7:153-162 (2010).

Wang et al., Comprehensive analysis of lung cancer pathology images to discover tumor shape and boundary features that predict survival outcome, Scientific Reports, 8:10393 (2018).

Wang et al., Deep learning assessment of tumor proliferation in breast cancer histological images, IEEE Int. Conf. Bioinfo. Biomed. (BIBM), 600-603 (2017).

Weinstein et al., The cancer genome atlas pan-cancer analysis project, Nat. Gene., 45:1113-1120 (2013).

Wimberly et al., PD-L1 expression correlates with tumor-infiltrating lymphocytes and response to neoadjuvant chemotherapy in breast cancer, Cancer Immunol. Res., 3(4):326-332 (2015).

Xu et al., A deep convolutional neural network for segmenting and classifying epithelial and stromal regions in histopathological images, Neurocomputing, 191:214-223 (2016).

(56) References Cited

OTHER PUBLICATIONS

Yi et al., Microvessel prediction in H&E stained pathology images using fully convolutional neural networks, BMC Bioinformatics, 19:64 (2018).

Yu et al., Predicting non-small cell lung cancer prognosis by fully automated microscopic pathology image features, Nat. Comm., 7:12474 (2016).

Yuan et al. Quantitative image analysis of cellular heterogeneity in breast tumors complements genomic profiling, Science Translational Medicine, 4(157):157ra143 (2012).

Yuan et al., Supplementary materials for quantitative image analysis of cellular heterogeneity in breast tumors complements genomic profiling, (2012), doi:10.1126/scitranslmed.3004330.

Zhang et al., Adversarial deep learning for microsatellite instability prediction from histopathology, slides, First Conference on Medical Imaging with Deep Learning (MIDL, 2018), Amsterdam, The Netherlands.

Zhu et al., Deciphering genomic underpinnings of quantitative MRI-based radiomic phenotypes of invasive breast carcinoma, Sci. Rep., 5:17787 (2016).

Pellegrino et al., "Controversies in oncology: are genomic tests quantifying homologous recombination repair deficiency (HRD) useful for treatment decision making?," ESMO Open 4(2) (2018).

Ulyanov et al., Instance normalization: the missing ingredient for fast stylization, arXiv:1607.08022, 1-6 (2017).

International Application No. PCT/US2020/024748, International Search Report and Written Opinion, dated Aug. 3, 2020.

International Application No. PCT/US2020/024748, Invitation to Pay Additional Fees, dated Jun. 10, 2020.

Anders et al., Differential expression analysis for sequence count data, Genome Biology, 11:R106 (2010).

Bensch et al., 89Zr-atezolizumab imaging as a non-invasive approach to assess clinical response to PD-L1 blockade in cancer, Nat. Med., 24:1852-1858 (2018).

Chang et al., Deep-learning convolutional neural networks accurately classify genetic mutations in gliomas, Am. J. Neuroradiology, (2018).

Chang et al., Residual convolution neural network for determination of IDH status in low- and high-grade gliomas from MR imaging, Clin. Cancer Res., 24(5):1073-1081 (2018).

Chen et al., Microscope 2.0: An augmented reality microscope with real-time artificial integration, Nat. Med., 25:1453-1457 (2019).

Chen et al., Pathomic fusion: An integrated framework for fusing histopathology and genomic features for cancer diagnosis and prognosis, downloaded from the Internet at: <https://arxiv.org/pdf/1912.08937v1.pdf> (Dec. 18, 2019).

Department of health and human services. Part I. overview information, Integration of imaging and fluid-based tumor monitoring in cancer therapy (R01 Clinical Trial Optional), (Feb. 5, 2018).

Dey et al., Visualizing the structure of RNA-seq expression data using grade of membership models, PLoS Genetics, 13(5) (2017).

FDA Summary of safety and effectiveness data (SSED), PD-L1 IHC 22C3 pharmDx, Dako North America, Inc., (Oct. 2, 2015).

FDA Summary of safety and effectiveness data (SSED), PD-L1 IHC 22C3 pharmDx, Dako North America, Inc., (Sep. 22, 2017).

KEYTRUDA medication guide, p. 46, from prescribing information guide, Merck & Co. Inc., revised (Sep. 2017) (Reference ID: 4156447).

Letter from U.S. Department of Health & Human Services to Agfa Healthcare N.V., regarding Enterprise Imaging XERO Viewer 81, dated (Jul. 3, 2017).

Letter from U.S. Department of Health & Human Services to Arterys, Inc. regarding Arterys Software v2.0, dated (Oct. 28, 2016).

Letter from U.S. Department of Health & Human Services to Arterys, Inc. regarding Arterys Viewer, dated (Jul. 18, 2017).

Letter from U.S. Department of Health & Human Services to Brainlab AG regarding DICOM Viewer, dated (Apr. 13, 2016).

Letter from U.S. Department of Health & Human Services to Healthmyne Inc. regarding Healthmyne PACS, dated (Aug. 20, 2015).

Letter from U.S. Department of Health & Human Services to Healthmyne Inc. regarding Healthmyne, dated (Jan. 15, 2016).

Letter from U.S. Department of Health and Human Services to Philips Medical Systems Nederland B.V. regarding Philips Intellisite Pathology Solution (PIPS), dated (Oct. 13, 2017).

Letter from U.S. Food & Drug Administration to Arterys, Inc. regarding Arterys Oncology DL, dated (Jan. 25, 2018).

Letter from U.S. Food & Drug Administration to Dako North America, Inc. regarding PD-L1 IHC 22C3 pharmDx, dated (Aug. 16, 2018).

Letter from U.S. Food & Drug Administration to Dako North America, Inc. regarding PD-L1 IHC 22C3 pharmDx, dated (Jun. 12, 2018).

Myronenko, 3D MRI brain tumor segmentation using autoencoder regularization, downloaded from the Internet at: <https://arxiv.org/pdf/1810.11654.pdf> (published Nov. 19, 2018).

Newman et al., Determining cell type abundance and expression from bulk tissues with digital cytometry, Nat. Biotec., 37:773-782 (2019).

Newman et al., Robust enumeration of cell subsets from tissue expression profiles, Nat. Methods, 12:453-457 (2015).

PD-L1 IHC 28-8 pharmDx Guide, 13 pp. Dako North America Inc. (Oct. 2015 edition).

Rajpurkar et al., Deep learning for chest radiograph diagnosis: A retrospective comparison of the CheXNeXt algorithm to practicing radiologists, PLOS Medicine, (2018).

Redox awarded patent for its electronic medical record integration technology, Aug. 29, 2018.

Shah et al., Deep learning assessment of tumor proliferation in breast cancer histological images, Int. Conf. Bioinform. Biomed., (2017).

Stanford ML Group, CheXNeXt: Deep learning for chest radiograph diagnosis, downloaded from the Internet at: <https://stanfordmlgroup.github.io/projects/chexnext/> (Nov. 2018).

Uzzan et al., Microvessel density as a prognostic factor in women with breast cancer, Cancer Res., 64(9):2941-55 (2004).

Yala et al., A deep learning mammography-based model for improved breast cancer risk prediction, Radiology, 292(1):60-66 (2019).

Young et al., Gene ontology analysis for RNA-seq: accounting for selection bias, Genome. Biol., 11:R14 (2010).

Zhang et al., Aspect-augmented adversarial network for domain adaptation, Transactions of the Association for Computational Linguistics, 5:515-528 (2017).

\* cited by examiner

Receive digital image file →

Analyze metadata and retrieve image at known resolution →

(optional step) Downsample to create image with optimal resolution →

Identify and eliminate pixels that are too bright or too dark →

Identify and eliminate pixels with non-tissue objects

FIG 4

PhiNet

| layer name | output size | sub layer |
|---|---|---|
| input layer | (434+32N) x (434+32N) x 3 | |
| conv1 | (214+16N) x (214+16N) x 64 | |
| max pool | (106+8N) x (106+8N) x 64 | |
| conv2_x | (52+4N) x (52+4N) x 64 | Four 3x3 conv layers |
| conv3_x | (24+2N) x (24+2N) x 128 | Four 3x3 conv layers |
| conv4_x | (14+2N) x (14+2N) x 256 | Four 3x3 conv layers |
| conv5_x | N x N x 512 | Four 3x3 conv layers |
| concat | N x N x (512+64+64) | |
| 1x1 conv | N x N x #classes | |
| softmax | N x N | |

No padding

ResNet-18

| layer name | output size | sub layer |
|---|---|---|
| input layer | 224 x 224 x 3 | |
| conv1 | 112 x 112 x 64 | |
| max pool | 56 x 56 x 64 | |
| conv2_x | 56 x 56 x 64 | Four 3x3 conv layers |
| conv3_x | 28 x 28 x 128 | Four 3x3 conv layers |
| conv4_x | 14 x 14 x 256 | Four 3x3 conv layers |
| conv5_x | 7 x 7 x 512 | Four 3x3 conv layers |
| avg_pool | 1 x 1 x 512 | |
| dense_layer | #classes | |
| softmax | #classes | | padding = 1 if filter_size = 3
Padding = 3 if filter_size = 7

FIG 6B

Detected lymphocytes (appearing as red dots) can be seen throughout tissue. The lymphocytes within the dark blue tumor tiles are tumor-infiltrating lymphoctyes.

ARTIFICIAL INTELLIGENCE SEGMENTATION OF TISSUE IMAGES

CROSS-REFERENCE TO RELATED APPLICATIONS

This application claims benefit of priority to and claims under 35 U.S.C. § 119(e)(1) the benefit of the filing date of U.S. provisional application Ser. No. 62/787,047 filed Dec. 31, 2018, the entire disclosure of which is incorporated herein by reference.

FIELD OF THE INVENTION

The present disclosure relates to techniques for the analysis of medical images and, more particularly, to techniques for analysis of histological slides other images of cancerous tissue.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To guide a medical professional in diagnosis, prognosis and treatment assessment of a patient's cancer, it is common to extract and inspect tumor samples from the patient. Visual inspection can reveal growth patterns of the cancer cells in the tumor in relation to the healthy cells near them and the presence of immune cells within the tumor. Pathologists, members of a pathology team, other trained medical professionals, or other human analysts visually analyze thin slices of tumor tissue mounted on glass microscope slides to classify each region of the tissue as one of many tissue classes that are present in a tumor sample. This information aids the pathologist in determining characteristics of the cancer tumor in the patient, which can inform treatment decisions. A pathologist will often assign one or more numerical scores to a slide, based on a visual approximation. Numerical scores assigned during microscope slide analysis include tumor purity, which is the percentage of the tissue that is formed by tumor cells.

Characteristics of the tumor may include tumor grade, tumor purity, degree of invasiveness of the tumor, degree of immune infiltration into the tumor, cancer stage, and anatomic origin site of the tumor, which is especially important for diagnosing and treating a metastatic tumor. These details about the cancer can help a physician monitor the progression of cancer within a patient and predict which anti-cancer treatments are likely to be successful in eliminating cancer cells from the patient's body.

Manually analyzing microscope slides is time consuming and requires a trained medical professional. Furthermore, because numerical scores are assigned by approximation, these scores are subjective, not quantitative.

High-resolution, digital images of microscope slides make it possible to use artificial intelligence to analyze the slides and classify the tissue components by tissue class.

A Convolutional Neural Network ("CNN") is a deep learning algorithm that analyzes digital images by assigning one class label to each input image. Slides, however, include more than one type of tissue, including the borders between neighboring tissue classes. There is a need to classify different regions as different tissue classes, in part to study the borders between neighboring tissue classes and the presence of immune cells among tumor cells. For a traditional CNN to assign multiple tissue classes to one slide image, the CNN would need to separately process each section of the image that needs a tissue class label assignment. Neighboring sections of the image overlap, so processing each section separately creates a high number of redundant calculations and is time consuming.

A Fully Convolutional Network (FCN) can analyze an image and assign classification labels to each pixel within the image, so a FCN is more useful for analyzing images that depict objects with more than one classification. A FCN generates an overlay map to show the location of each classified object in the original image. However, FCN deep learning algorithms that analyze digital slides would require training data sets of images with each pixel labeled as a tissue class, which requires too much annotation time and processing time to be practical. In digital images of slides, each edge of the image may contain more than 10,000-100,000 pixels. The full image may have at least $10,000^2$-$100,000^2$ pixels, which forces long algorithm run times due to the intense computation required. The high number of pixels makes it infeasible to use traditional FCNs to segment digital images of slides.

SUMMARY OF THE INVENTION

In accordance with an example, a method for creating an overlay map on a digital image of a slide comprises: receiving the digital image; separating the digital image into a plurality of tiles; and identifying the majority class of tissue visible within each tile in the plurality of tiles, based on a multi-tile analysis.

In some examples, the method includes generating a digital overlay drawing of an outer edge of each cell in the image.

In some examples, the digital overlay drawing is prepared at the resolution level of an individual pixel.

In accordance with another example, a method for tissue classification of a digital image of a slide includes: receiving the digital image; generating a digital overlay drawing of a tissue region in the digital image; and displaying, in the digital overlay drawing, tiles over the tissue region and visually identifying predicted content of each tile, to generate a classification map classifying the digital image.

In some examples, the method further includes determining the predicted content for each tile using a classification model configured as a multi-resolution fully convolutional network, the multi-resolution fully convolution network configured to perform classification on digital images of different zoom levels.

In some examples, the method further includes using a classification model, for each tile, determining a classification from a plurality of classifications.

In some examples, the plurality of classifications include tumor epithelium, normal epithelium, immune, stroma, necrosis, blood, and fat.

In accordance with yet another example, a method for cell detection in a digital image of a slide includes: receiving the digital image; identifying cell objects in the digital image; generating a digital overlay drawing for the digital image; and displaying, in the digital overlay drawing, a polygon outlining each of the identified cell objects.

In some examples, the cell objects include lymphocyte cells and not lymphocyte cells.

In some examples, the cell objects comprise CD3, CD8, CD20, pancytokeratin, and smooth muscle actin.

In accordance with yet another example, a method for tissue classification of a digital image of a slide includes: receiving the digital image; segmenting the digital image into a plurality of tiles; determining a predicted class for each tile; identifying a plurality of cell objects in the digital image; determining a predicted class for each of the plurality of cell objects; and for each of the plurality of tiles that corresponds to one of the plurality of cell objects, assigning the tile the predicted class of the corresponding cell object in place of the predicted class of the tile.

In some examples, the method further includes: storing, in a first file, for each tile, a tile position and the predicted class of the tile; and storing, in a second file, for each cell object, a polygon outlining the cell object and the predicted class of the cell object.

In some examples, the method further includes generating a digital overlay drawing for the digital image, where the digital overlay drawing is a cell mask displaying a polygon around each cell object.

In some examples, the method further includes generating a digital overlay drawing for the digital image, where the digital overlay drawing is a histology mask displaying the plurality of tiles and the predict class for each tile.

In some examples, the method further includes generating a digital overlay drawing for the digital image; and displaying, in the digital overlay drawing, the plurality of tiles and the predicted class for each tile that does not correspond to a cell object, and displaying, the plurality of cell objects and the predicted class of each cell object.

In some examples, the method further includes: generating a digital overlay drawing for the digital image, wherein the digital overlay drawing includes the digital image; and displaying the digital overlay drawing.

In some examples, the method further includes: generating a digital overlay drawing for the digital image, wherein the digital overlay drawing includes a generated version of the digital image; and displaying the digital overlay drawing.

In some examples, the method further includes: generating a plurality of digital overlay drawings for the digital image, where each digital overlay drawing corresponds to a different predicted class; and selectively displaying one of the plurality of digital overlay drawings.

In some examples, the method further includes generating a digital overlay drawing for the digital image, where the digital overlay drawing comprises percentages of predict classes corresponding to the digital image.

In some examples, the method further includes generating a digital overlay drawing for the digital image, where the digital overlay drawing comprises total counts of predict classes corresponding to the digital image.

In accordance with another example, a system includes a processor and a computer-readable memory is provided, the memory storing instructions that when executed by the processor cause the processor to perform the methods described herein.

In accordance with an example, a system includes a processor and a computer-readable memory storing instructions that when executed by the processor cause the processor to: receive the digital image; separate the digital image into a plurality of tiles; and identify the majority class of tissue visible within each tile in the plurality of tiles, based on a multi-tile analysis.

In accordance with an example, a system includes a processor and a computer-readable memory storing instructions that when executed by the processor cause the processor to: receive the digital image; generate a digital overlay drawing of a tissue region in the digital image; and display, in the digital overlay drawing, tiles over the tissue region and visually identify predicted content of each tile, to generate a classification map classifying the digital image.

In accordance with an example, a system includes a processor and a computer-readable memory storing instructions that when executed by the processor cause the processor to: receive the digital image; identify cell objects in the digital image; generate a digital overlay drawing for the digital image; and display, in the digital overlay drawing, a polygon outlining each of the identified cell objects.

In accordance with an example, a system includes a processor and a computer-readable memory storing instructions that when executed by the processor cause the processor to: receive the digital image; segment the digital image into a plurality of tiles; determine a predicted class for each tile; identify a plurality of cell objects in the digital image; determine a predicted class for each of the plurality of cell objects; and for each of the plurality of tiles that corresponds to one of the plurality of cell objects, assign the tile the predicted class of the corresponding cell object in place of the predicted class of the tile.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

The figures described below depict various aspects of the system and methods disclosed herein. It should be understood that each figure depicts an example of aspects of the present systems and methods.

FIG. 4 is a flowchart of a method for preparing digital images of histology slides for tissue segmentation and mapping analysis, in accordance with an example.

FIG. 6B compares the layers of a known image classification algorithm with an exemplary tissue segmentation algorithm, in accordance with an example.

DETAILED DESCRIPTION OF THE INVENTION

Figure 1:
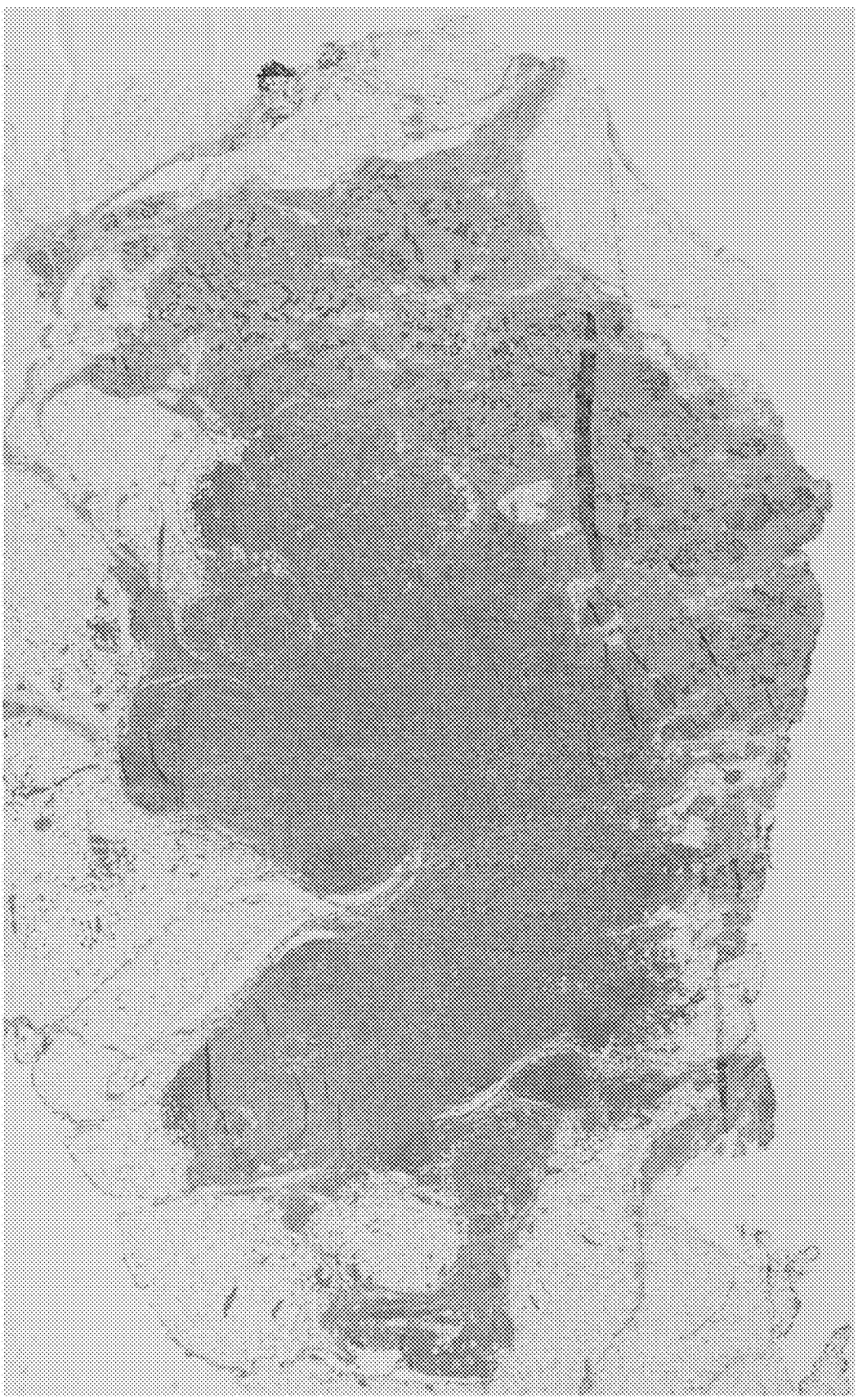
FIG. 1 illustrates an example of a digital image of a histology slide, in accordance with an example.

FIG. 1 illustrates an example of a digital image of a histology slide, also known as a pathology slide. In one example, the digital image is created by a scanner that visually captures a histology slide. In an alternative example, the digital image is created by a digital camera attached to a microscope. The histology slide may be made of two transparent glass layers with a slice of tissue affixed between the two layers of glass. The thin slice of tissue may be very thin, with a thickness, for instance, of approximately 5 microns. Tissue may be preserved in a fixative, including formaldehyde, formalin, and paraffin. The tissue contains a combination of many individual biological cells that are visible on the slide. The scanner may include a Philips digital pathology slide scanner, or any scanner known in the art that can create a digital image file.

In one example, the tissue slice contains stain that attaches to certain types of cells or cell parts within the tissue. The stain may include hematoxylin and eosin (H & E) stain and any immunohistochemical (IHC) stain. Hematoxylin is a stain that will bind to DNA and cause the nucleus of a cell to appear blue or purple. Eosin is a stain that will bind to proteins and cause all of the remaining parts of the cell, namely the cytoplasm interior, to appear red or pink. An IHC stain is comprised of an antibody coupled with a molecule that displays one of many colors. The antibody may be designed to bind to any surface shape to target a specific molecule such as a protein or a sugar. The IHC stain will result in a concentration of dye of the selected color near any copies of a specific target molecule present on the slide. Some commonly monitored proteins in tumor samples include programmed death ligand 1 (PD-L1), whose presence in a tumor region can indicate whether a tumor will respond to immunotherapy, and cluster of differentiation 3 (CD3), which is associated with T lymphocyte immune cells. The presence of CD3 in a tumor region may be associated with tumor infiltrating lymphocytes which can indicate that the tumor will be susceptible to anti-cancer immunotherapy.

In some examples, the slide may also contain additional control slices of tissue that are not from the tumor sample, which serve as a positive and/or negative control for the staining process. Control tissue slices are more common on slides that have IHC staining.

Figure 2:
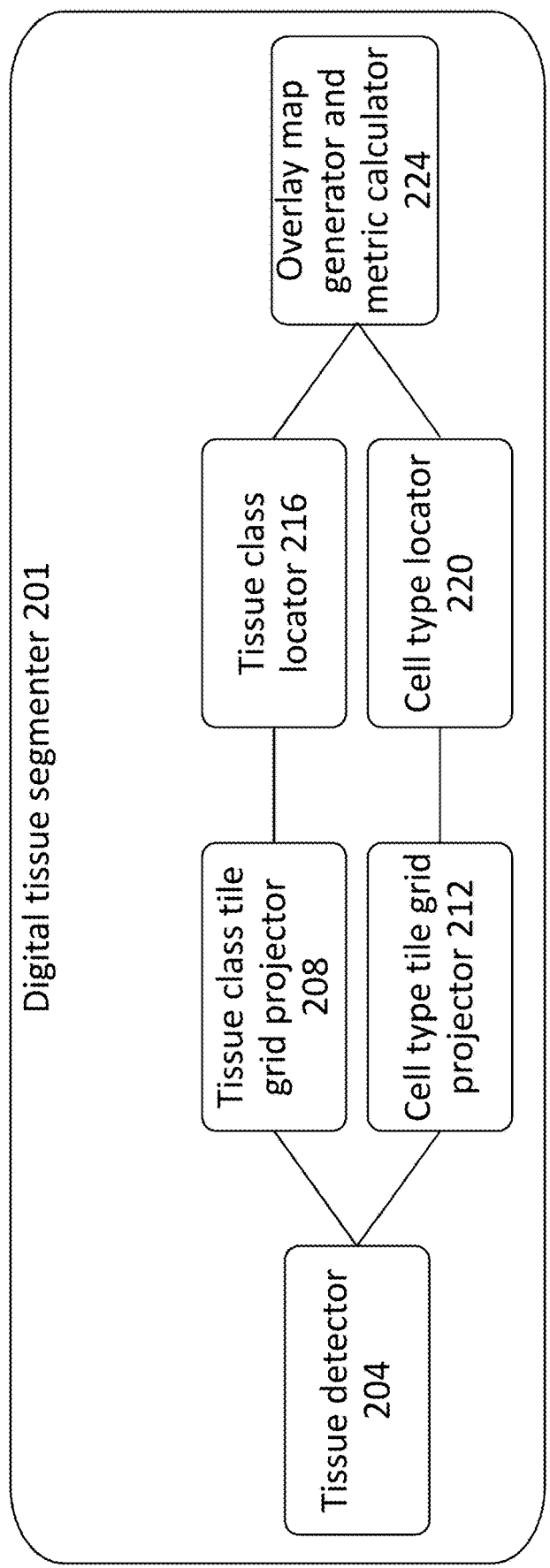
FIG. 2 is an overview of a digital tissue segmenter, in accordance with an example.

FIG. 2 is an overview of a digital tissue image segmenter 201. The digital tissue segmenter 201 may comprise a computational method and apparatus that receives a digital image of a slide, displaying a slice of a tumor sample, and creates a high-density, grid-based digital overlay map that identifies the majority class of tissue visible within each grid tile in the digital image. The digital tissue segmenter 201 may also generate a digital overlay drawing of the outer edge of each cell in the slide image, at the resolution level of an individual pixel.

In another example, the digital tissue segmenter 201 is a computational method and apparatus that receives a digital radiology image and efficiently creates a high-density, grid-based digital overlay map that identifies the majority class of tissue visible within each grid tile in the digital image. The radiology image may depict a tumor within a patient's body. The radiology image may be 3-dimensional (3-D) and the digital tissue segmenter 201 may receive 2-dimensional slices of the 3-dimensional image as an input image. Radiology images include but are not limited to X-rays, CT scans, MRI's, ultrasounds, and PET.

The digital tissue segmenter 201 shown at FIG. 2 includes a tissue detector 204 for detecting the areas of a digital image that have tissue, and storing data that includes the locations of the areas detected to have tissue. The tissue detector 204 transfers tissue area location data to a tissue class tile grid projector 208 and a cell tile grid projector 212. The tissue class tile grid projector 208 receives the tissue area location data, as described in further detail below and with reference to FIGS. 5A and 5C. For each of several tissue class labels, the tissue class locator 216 calculates a percentage that represents the likelihood that the tissue class label accurately describes the image within each tile to determine where each tissue class is located in the digital image. For each tile, the total of all of the percentages calculated for all tissue class labels will sum to 1, which reflects 100%. In one example, the tissue class locator 216 assigns one tissue class label to each tile to determine where each tissue class is located in the digital image. The tissue class locator stores the calculated percentages and assigned tissue class labels associated with each tile.

Examples of tissue classes include but are not limited to tumor, stroma, normal, immune cluster, necrosis, hyperplasia/dysplasia, red blood cells, and tissue classes or cell types that are positive (contain a target molecule of an IHC stain) or negative for an IHC stain target molecule (do not contain that molecule). Examples also include tumor positive, tumor negative, lymphocyte positive, and lymphocyte negative. The grid-based digital overlay map or a separate digital overlay may also highlight individual immune cells, including lymphocytes, cytotoxic T cells, B cells, NK cells, macrophages, etc.

In one example, the digital tissue segmenter 201 includes a multi-tile algorithm that concurrently analyzes many tiles in an image, both individually and in conjunction with the portion of the image that surrounds each tile. The multi-tile algorithm may achieve a multiscale, multiresolution analysis that captures both the contents of the individual tile and the context of the portion of the image that surrounds the tile. The multi-tile algorithm is described further with reference to FIGS. 5A-5C and 6A-6B. Because the portions of the image that surround two neighboring tiles overlap, analyzing many tiles and their surroundings concurrently instead of separately analyzing each tile with its surroundings reduces computational redundancy and results in greater processing efficiency.

In one example, the digital tissue segmenter may store the analysis results in a 3-dimensional probability data array, which contains one 1-dimensional data vector for each analyzed tile. In one example, each data vector contains a list of percentages that sum to 100%, each indicating the probability that each grid tile contains one of the tissue classes analyzed. The position of each data vector in the orthogonal 2-dimensional plane of the data array, with respect to the other vectors, corresponds with the position of the tile associated with that data vector in the digital image, with respect to the other tiles.

Figure 8:
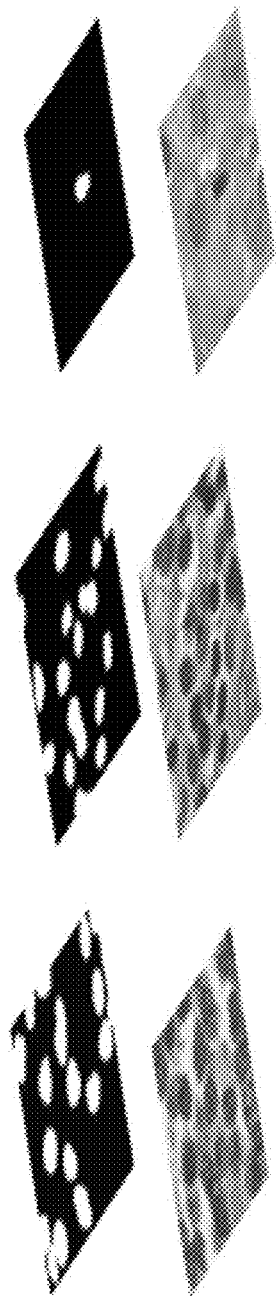
FIG. 8 illustrates exemplary training set images for the cell type locator, in accordance with an example.

The cell type tile grid projector receives the tissue area location data and projects a cell type tile grid onto the areas of an image with tissue, as described with further detail with respect to FIG. 8. The cell type locator may detect each biological cell in the digital image within each grid, prepare an outline on the outer edge of each cell, and classify each cell by cell type. The cell type locator stores data including the location of each cell and each pixel that contains a cell outer edge, and the cell type label assigned to each cell.

The overlay map generator and metric calculator may retrieve the stored 3-dimensional probability data array from the tissue class locator, and convert it into an overlay map that displays the assigned tissue class label for each tile. The assigned tissue class for each tile may be displayed as a transparent color that is unique for each tissue class. In one example, the tissue class overlay map displays the probabilities for each grid tile for the tissue class selected by the user. The overlay map generator and metric calculator also retrieves the stored cell location and type data from the cell type locator, and calculates metrics related to the number of cells in the entire image or in the tiles assigned to a specific tissue class.

Figure 3A:
FIG. 3A illustrates a tissue segmentation overlay map created by the digital tissue segmenter, in accordance with an example.
Figure 3A:
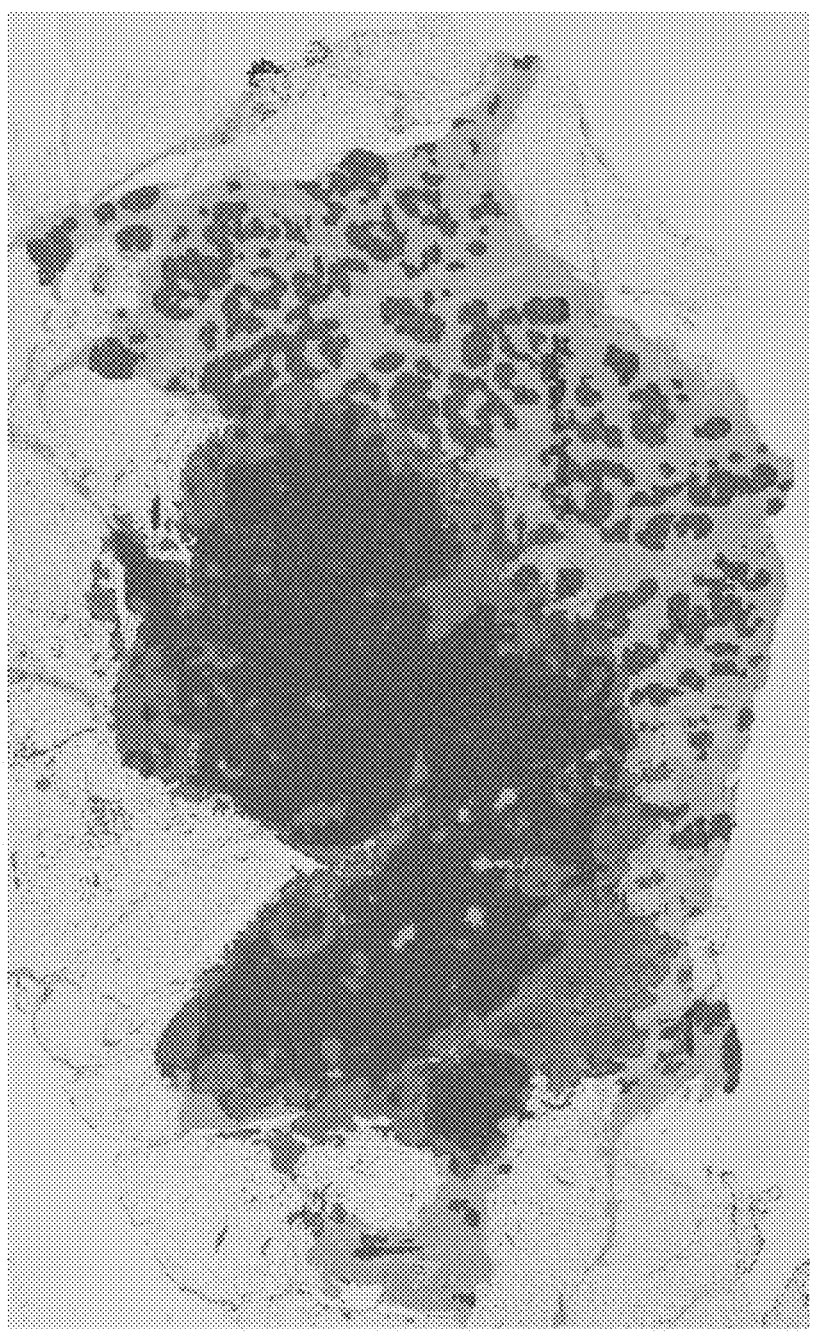
Figure 3B:
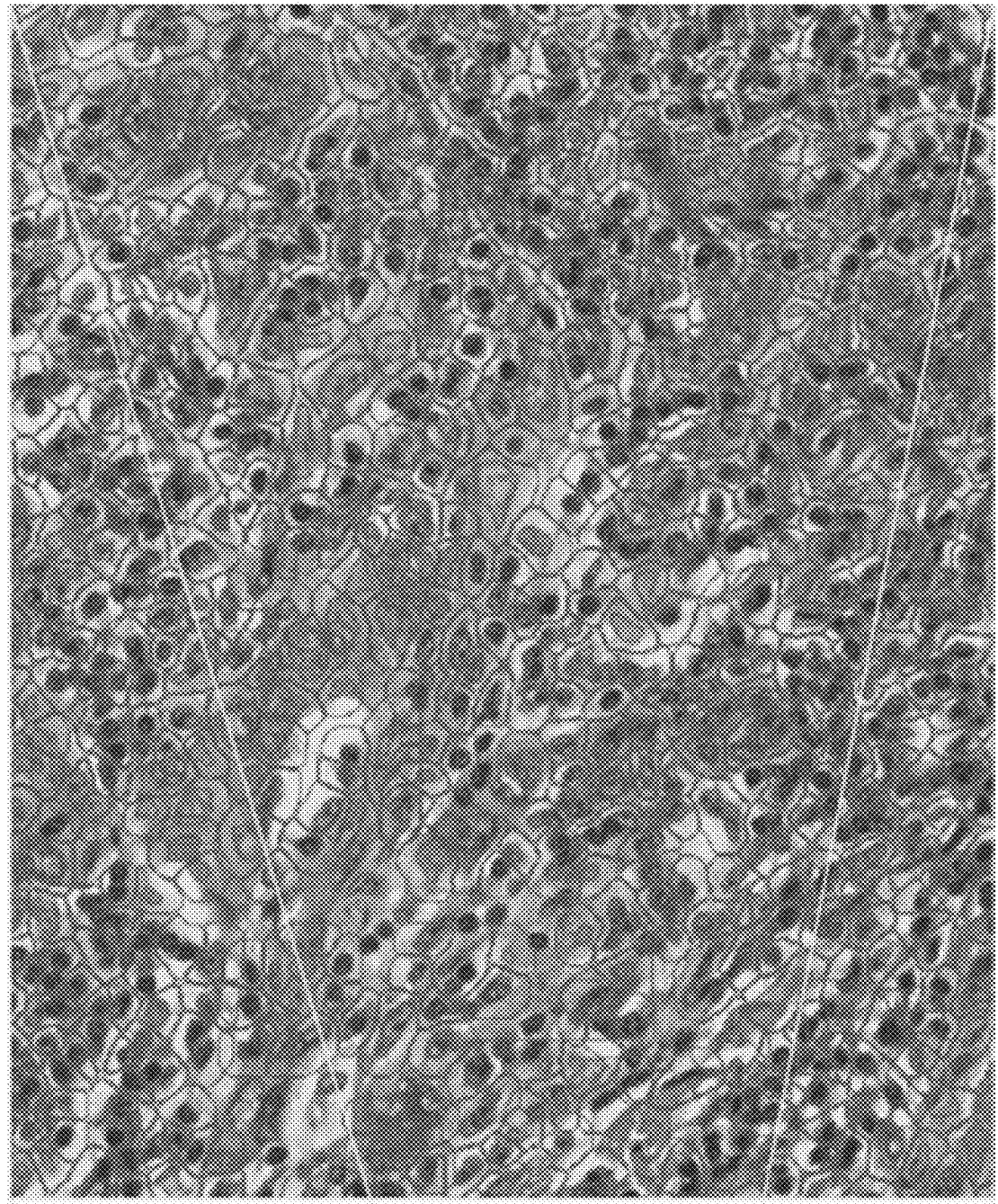
FIG. 3B illustrates a cell outer edge overlay map created by the digital tissue segmenter, in accordance with an example.
Figure 3C:
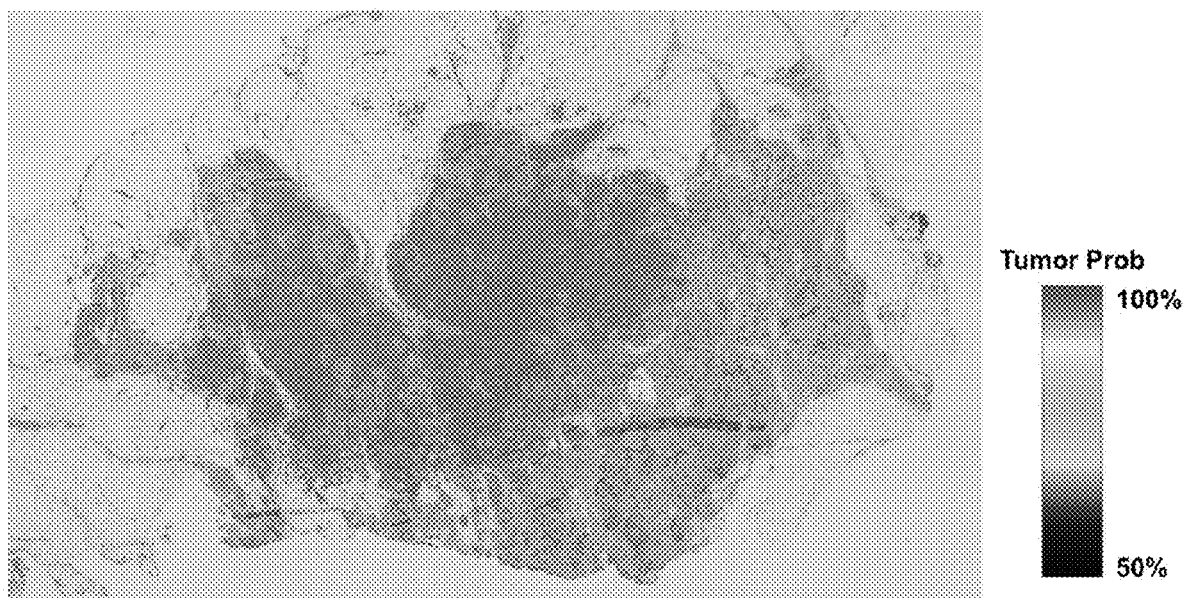
FIG. 3C illustrates a tumor probability overlay heatmap map created by the digital tissue segmenter, in accordance with an example.

FIGS. 3A and 3B illustrate examples of a digital overlay created by the digital tissue segmenter 201. FIG. 3A illustrates a tissue class overlay map created by the overlay map generator of the digital tissue segmenter 201. FIG. 3B illustrates a cell outer edge overlay map created by the overlay map generator of the digital tissue segmenter 201. The overlay map generator may display the digital overlays as transparent or opaque layers that cover the slide image, aligned such that the slide location shown in the overlay and the slide image are in the same location on the display. The overlay map may have varying degrees of transparency. The degree of transparency may be adjustable by the user. The overlay map generator may report the percentage of the labeled tiles that are associated with each tissue class label, ratios of the number of tiles classified under each tissue class, the total area of all grid tiles classified as a single tissue class, and ratios of the areas of tiles classified under each tissue class. FIG. 3C illustrates a tumor probability overlay heatmap map created by the digital tissue segmenter, in accordance with another example.

The digital tissue segmenter 201 may also report the total number of cells or the percentage of cells that are located in an area defined by either a user, the entire slide, a single grid tile, by all grid tiles classified under each tissue class, or cells that are classified as immune cells. The digital tissue segmenter 201 may also report the number of cells classified as immune cells that are located within areas classified as tumor or any other tissue class.

In one example, the digital tissue segmenter 201 is capable of calculating the percentage of cells that are colored by an IHC stain to highlight particular cells containing the molecule targeted by the stain. The percentage of cells may be specific to a tissue class region or a cell type (or cell object). For example, if the IHC stain targets programmed death ligand 1 (PD-L1) protein, the digital tissue segmenter 201 may determine the percentage of cancer cells in the tumor tissue class that contain PD-L1 protein. If the IHC stain targets cluster of differentiation 3 (CD3) protein, the digital tissue segmenter 201 may determine the percentage of lymphocytes or total cells that contain CD3. In other examples, the digital tissue segmenter 201 may determine the percentage of CD8, CD20, pancytokeratin, and/or smooth muscle actin in the digital image.

The map generator and metric calculator 224 may also create a digital overlay map, showing predicted IHC staining on a digital image of a slide that contains no IHC stain. In one example, the tissue class locator 216 can predict where IHC staining for a specific molecule would exist on a slide, or the percentage of cells that express a specific protein, based on input images that only contain H and E stain.

The digital overlays and reports generated by the digital tissue segmenter 201 can be used to assist medical professionals in more accurately estimating tumor purity, and in locating regions or diagnoses of interest, including invasive tumors having tumor cells that protrude into the non-tumor tissue region that surrounds the tumor. They can also assist medical professionals in prescribing treatments. For example, the number of lymphocytes in areas classified as tumor may predict whether immunotherapy will be successful in treating a patient's cancer.

The digital overlays and reports generated by the digital tissue segmenter 201 can also be used to determine whether the slide sample has enough high-quality tissue for successful genetic sequence analysis of the tissue. Genetic sequence analysis of the tissue on a slide is likely to be successful if the slide contains an amount of tissue and/or has a tumor purity value that exceeds a user-defined tissue amount and tumor purity thresholds. In one example, the digital tissue segmenter 201 may label a slide as accepted or rejected for sequence analysis, depending on the amount of tissue present on the slide and the tumor purity of the tissue on the slide. In some examples, the digital tissue segmenter 201 is configured to determine tumor-infiltrating lymphocytes (TILS). An example of a TILS process and engine is disclosed, for example, in U.S. Provisional Patent Application No. 62/889,521, titled "Determining Therapeutic Tumor-Infiltrating Lymphocytes (TILS) from Histopathology Slide Images," filed on Aug. 20, 2019, which is incorporated herein by reference and in its entirety for all purposes.

The digital tissue segmenter 201 may also label a slide as uncertain, to recommend that it be manually reviewed by a trained analyst, who may be a member of a pathology team. In one example, if the amount of tissue present on the slide is approximately equal to the user-defined tissue amount threshold or within a user-defined range, the digital tissue segmenter 201 may label the slide as uncertain. In one example, if the tumor purity of the tissue present on the slide is approximately equal to the user-defined tumor purity threshold or within a user-defined range, the digital tissue segmenter 201 may label the slide as uncertain.

In one example, the overlay map generator and metric calculator calculates the amount of tissue on a slide by measuring the total area covered by the tissue or by counting the number of cells on the slide. The number of cells on the slide may be determined by the number of cell nuclei visible on the slide. In one example, the digital tissue segmenter 201 calculates the proportion of tissue that is cancer cells by dividing the number of cell nuclei within grid areas that are labeled tumor by the total number of cell nuclei on the slide. The digital tissue segmenter 201 may exclude cell nuclei or outer edges of cells that are located in tumor areas but which belong to cells that are characterized as lymphocytes. The proportion of tissue that is cancer cells is known as the tumor purity of the sample. In some examples, the overlay map generator and metric calculator is configured to predict aligned tumor purity, for example, by calculating the fraction of tumor cells within a micro-dissected tissue area instead of within the whole tissue. These techniques herein may be configured into other tumor purity models based incorporated one or multiple definitions of tumor purity definition from pathologists.

In one example, the digital tissue segmenter 201 compares the tumor purity to the user-selected minimum tumor purity threshold and the number of cells in the digital image to a user-selected minimum cell threshold and approves the slide if both thresholds are exceeded. In one example, the user-selected minimum tumor purity threshold is 0.20, which is 20%.

In one example, the slide is given a composite tissue amount score that multiplies the total area covered by tissue detected on the slide by a first multiplier value, multiplies the number of cells counted on the slide by a second multiplier value, and sums the products of these multiplications.

The digital tissue segmenter 201 may calculate whether the grid areas that are labeled tumor are spatially consolidated or dispersed among non-tumor grid areas. If the digital tissue segmenter 201 determines that the tumor areas are spatially consolidated, the digital tissue segmenter 201 may produce a digital overlay of a recommended cutting boundary that separates the slide regions classified as tumor and the slide regions classified as non-tumor or within the areas classified as non-tumor, proximal to the areas classified as tumor. This recommended cutting boundary can be a guide to assist a technician in dissecting a slide to isolate a maximum amount of tumor or non-tumor tissue from the slide, especially for genetic sequence analysis.

The digital tissue segmenter 201 may include clustering algorithms that calculate and report information about the spacing and density of type classified cells, tissue class classified tiles, or visually detectable features on the slide. For example, this may be accomplished by choosing a clustering algorithm and a set of objects to cluster, and the output can either be a qualitative description or a numerical value. An example clustering algorithm for cells would find spatial information of cells, such as, the center locations of tumor cells or lymphocytes, the size of each cell group, and the distance between the center of each cell group, where such spatial information is used for further outcome related analysis. The spacing information includes distribution patterns and heat maps for immune cells, tumor cells, or other cells. These patterns may include clustered, dispersed, dense, and non-existent. This information is useful to determine whether immune cells and tumor cells cluster together and what percentage of the cluster areas overlap, which may facilitate in predicting immune infiltration and patient response to immunotherapy.

The digital tissue segmenter 201 may also calculate and report average tumor cell roundness, average tumor cell perimeter length, and average tumor nuclei density.

The spacing information also includes mixture levels of tumor cells and immune cells. The clustering algorithms can calculate the probability that two adjacent cells on a given slide will be either two tumor cells, two immune cells, or one tumor cell and one immune cell.

The clustering algorithms can also measure the thickness of any stroma pattern located around an area classified as tumor. The thickness of this stroma surrounding the tumor region may be a predictor of a patient's response to treatment.

The digital tissue segmenter 201 may also calculate and report statistics including mean, standard deviation, sum, etc. for the following information in each grid tile of either a single slide image or aggregated from many slide images: red green blue (RGB) value, optical density, hue, saturation, grayscale, and stain deconvolution. Deconvolution includes the removal of the visual signal created by any individual stain or combination of stains, including hematoxylin, eosin, or IHC staining.

The digital tissue segmenter 201 may also incorporate known mathematical formulae from the fields of physics and image analysis to calculate visually detectable basic features for each grid tile. Visually detectable basic features, including lines, patterns of alternating brightness, and outlineable shapes, may be combined to create visually detectable complex features including cell size, cell roundness, cell shape, and staining patterns referred to as texture features.

The digital overlays, reports, statistics and estimates produced by the digital tissue segmenter 201 may be useful for predicting patient survival, PD-L1 status of a tumor or immune cluster, microsatellite instability, TILS %, and the origin of a tumor when the origin is unknown or the tumor is metastatic. Overlays of such status information can provide an illustrated estimate of how well a patient will respond to certain immunotherapies, in some examples. The overlay reports are not inherently biased towards any class of therapy, and may be used for indicating cell-based, vaccine, and cytokine therapies, for example. The visualized reports may be adjusted to better display tissue type, cell type, TILS %, etc. for the purpose of identifying certain immunotherapies. For example, the techniques herein can be adapted with requisite training data for specific cell- and tumor-type identification. For example, various models can be chosen to predict subtype of tumor (1 a model can predict DCIS, a subtype of tumor in breast cancer which is associated with higher risk of developing invasive breast cancer and 2 a model can predict squamous cell carcinoma vs adenocarcinoma in lung cancer). Another example is the model can be adjusted to predict subtypes of cells in lymphatic tissues, such as lymphocytes vs plasma cells.

The digital tissue segmenter 201 may calculate relative densities of each type of immune cell on an entire slide, in the areas designated as tumor or another tissue class. Immune tissue classes include lymphocytes, cytotoxic T cells, B cells, NK cells, macrophages, etc.

In one example, the act of scanning or otherwise digitally capturing a histology slide automatically triggers the digital tissue segmenter 201 to analyze the digital image of that histology slide.

In one example, the digital tissue segmenter 201 allows a user to edit a cell outer edge or a border between two tissue classes on a tissue class overlay map or a cell outer edge overlay map and saves the altered map as a new overlay.

FIG. 4 is a flowchart of a method for preparing digital images of histology slides for tissue classification and mapping analysis.

In one example, each digital image file received by the digital tissue segmenter 201 contains multiple versions of the same image content, and each version has a different resolution. The file stores these copies in stacked layers, arranged by resolution such that the highest resolution image containing the greatest number of bytes is the bottom layer. This is known as a pyramidal structure. In one example, the highest resolution image is the highest resolution achievable by the scanner or camera that created the digital image file.

In one example, each digital image file also contains metadata that indicates the resolution of each layer. The digital tissue segmenter 201 can detect the resolution of each layer in this metadata and compare it to user-selected resolution criteria to select a layer with optimal resolution for analysis. In one example, the optimal resolution is 1 pixel per micron (downsampled by 4).

In one example, the digital tissue segmenter 201 receives a Tagged Image File Format (TIFF) file with a bottom layer resolution of four pixels per micron. This resolution of 4 pixels per micron corresponds to the resolution achieved by a microscope objective lens with a magnification power of "40×". In one example, the area that may have tissue on the slide is up to 100,000×100,000 pixels in size.

In one example, the TIFF file has approximately 10 layers, and the resolution of each layer is half as high as the resolution of the layer below it. If the higher resolution layer had a resolution of four pixels per micron, the layer above it will have two pixels per micron. The area represented by one pixel in the upper layer will be the size of the area represented by four pixels in the lower layer, meaning that the length of each side of the area represented by one upper layer pixel will be twice the length of each side of the area represented by one lower layer pixel.

Each layer may be a 2× downsampling of the layer below it. Downsampling is a method by which a new version of an original image can be created with a lower resolution value than the original image. There are many methods known in the art for downsampling, including nearest-neighbor, bilinear, hermite, bell, Mitchell, bicubic, and Lanczos resampling.

In one example, 2× downsampling means that the red green blue (RGB) values from three of four pixels that are located in a square in the higher resolution layer are replaced by the RGB value from the fourth pixel to create a new, larger pixel in the layer above, which occupies the same space as the four averaged pixels.

In one example, the digital image file does not contain a layer or an image with the optimal resolution. In this case, the digital tissue segmenter 201 can receive an image from the file having a resolution that is higher than the optimal resolution and downsample the image at a ratio that achieves the optimal resolution.

In one example, the optimal resolution is 2 pixels per micron, or "20×" magnification, but the bottom layer of a TIFF file is 4 pixels per micron and each layer is downsampled 4× compared to the layer below it. In this case, the TIFF file has one layer at 40× and the next layer at 10× magnification, but does not have a layer at 20× magnification. In this example, the digital tissue segmenter 201 reads the metadata and compares the resolution of each layer to the optimal resolution and does not find a layer with the optimal resolution. Instead, the digital tissue segmenter 201 retrieves the 40× magnification layer, then downsamples the image in that layer at a 2× downsampling ratio to create an image with the optimal resolution of 20× magnification.

After the digital tissue segmenter 201 obtains an image with an optimal resolution, it transmits the image to the tissue detector 204, which locates all parts of the image that depict tumor sample tissue and digitally eliminates debris, pen marks, and other non-tissue objects.

In one example, the tissue detector 204 differentiates between tissue and non-tissue regions of the image and uses gaussian blur removal to edit pixels with non-tissue objects. In one example, any control tissue on a slide that is not part of the tumor sample tissue can be detected and labeled as control tissue by the tissue detector or manually labeled by a human analyst as control tissue that should be excluded from the downstream tile grid projections.

Non-tissue objects include artifacts, markings, and debris in the image. Debris includes keratin, severely compressed or smashed tissue that cannot be visually analyzed, and any objects that were not collected with the sample.

In one example, a slide image contains marker ink or other writing that the tissue detector 204 detects and digitally deletes. Marker ink or other writing may be transparent over the tissue, meaning that the tissue on the slide may be visible through the ink. Because the ink of each marking is one color, the ink causes a consistent shift in the RGB values of the pixels that contain stained tissue underneath the ink compared to pixels that contain stained tissue without ink.

In one example, the tissue detector 204 locates portions of the slide image that have ink by detecting portions that have RGB values that are different from the RGB values of the rest of the slide image, where the difference between the RGB values from the two portions is consistent. Then, the tissue detector may subtract the difference between the RGB values of the pixels in the ink portions and the pixels in the non-ink portions from the RGB values of the pixels in the ink portions to digitally delete the ink.

In one example, the tissue detector 204 eliminates pixels in the image that have low local variability. These pixels represent artifacts, markings, or blurred areas caused by the tissue slice being out of focus, an air bubble being trapped between the two glass layers of the slide, or pen marks on the slide.

In one example, the tissue detector 204 removes these pixels by converting the image to a grayscale image, passing the grayscale image through a gaussian blur filter that mathematically adjusts the original grayscale value of each pixel to a blurred grayscale value to create a blurred image. Other filters may be used to blur the image. Then, for each pixel, the tissue detector 204 subtracts the blurred grayscale value from the original grayscale value to create a difference grayscale value. In one example, if a difference grayscale value of a pixel is less than a user-defined threshold, it may indicate that the blur filter did not significantly alter the original grayscale value and the pixel in the original image was located in a blurred region. The difference grayscale values may be compared to a threshold to create a binary mask that indicates where the blurred regions are that may be designated as non-tissue regions. A mask may be a copy of an image, where the colors, RGB values, or other values in the pixels are adjusted to show the presence or absence of an object of a certain type to show the location of all objects of that type. For example, the binary mask may be generated by setting the binary value of each pixel to 0 if the pixel has a difference grayscale value less than a user-defined blur threshold and setting the binary value of each pixel to 1 if the pixel has a difference grayscale value higher than or equal to a user-defined blur threshold. The regions of the binary mask that have pixel binary values of 0 indicate blurred areas in the original image that may be designated as non-tissue.

The tissue detector 204 may also mute or remove extreme brightness or darkness in the image. In one example, the tissue detector 204 converts the input image to a grayscale image, and each pixel receives a numerical value according to how bright the pixel is. In one example, the grayscale values range from 0 to 255, where 0 represents black and 255 represents white. In pixels with a grayscale value above a brightness threshold value, the tissue detector will replace the grayscale value of those pixels with the brightness threshold value. For pixels with a grayscale value below a darkness threshold value, the tissue detector will replace the grayscale value of those pixels equal with the darkness threshold value. In one example, the brightness threshold value is approximately 210. In one example, the darkness threshold value is approximately 45. The tissue detector stores the image with the new grayscale values in a data file.

In one example, the tissue detector 204 analyzes the altered image for any artifacts, debris, or markings that remain after the first analysis. The tissue detector scans the image and categorizes any remaining groups of pixels with a certain color, size, or smoothness as non-tissue.

In one example, the slide has H and E staining and most tissue in the slide image will have a pink stain. In this example, the tissue detector 204 categorizes all objects without any pink or red hue, as determined by the RGB value of the pixels that represent the object, as non-tissue. The tissue detector 204 may interpret any color or the lack of any color in a pixel to indicate the presence or absence of tissue in that pixel.

In one example, the tissue detector 204 detects the contours of each object in the image in order to measure the size and smoothness of each object. Pixels that are very dark may be debris, and pixels that are very bright may be background, which are both non-tissue objects. Therefore, tissue detector 204 may detect the contours of each object by converting the image to grayscale, comparing the grayscale values of each pixel to a range of user-determined range of values that are not too bright or too dark, and determining whether the grayscale value is within the range to produce a binary image where each pixel is assigned one of two numerical values.

For example, to threshold an image, the tissue detector 204 may compare the grayscale values of each pixel to a user-defined range of values and replace each grayscale value outside of the user-defined range with the value 0 and each grayscale value within a user-defined range with the value 1. Then, the tissue detector 204 draws all contours of all objects as the outer edge of each group of adjacent pixels having a value of 1. Closed contours indicate the presence of an object, and the tissue detector 204 measures the area within the contours of each object to measure the size of the object.

In one example, tissue objects on a slide are unlikely to make contact with the outer edges of the slide and the tissue detector 204 categorizes all objects that contact the edge of a slide as non-tissue.

In one example, after measuring the size of each object, the tissue detector 204 ranks the sizes of all objects and designates the largest value to be the size of the largest object. The tissue detector 204 divides the size of each object by the size of the largest object and compares the resulting size quotient to a user-defined size threshold value. If the size quotient for an object is smaller than the user-defined size threshold value, the tissue detector 204 designates that object as non-tissue. In one example, the user-defined size threshold value is 0.1.

Before measuring the size of each object, the tissue detector 204 may first downsample the input image to reduce the likelihood of designating portions of a tissue object as non-tissue. For example, a single tissue object may appear as a first tissue object portion surrounded by one or more additional tissue object portions having a smaller size. After thresholding, the additional tissue object portions may have a size quotient smaller than the user-defined size threshold value and may be erroneously designated as non-tissue. Downsampling before thresholding causes a small group of adjacent pixels having values of 1 surrounded by pixels having values of 0 in the original image to be included in a proximal, larger group of pixels having values of 1. The opposite may also be true, for small groups of adjacent pixels having values of 0 surrounded by pixels having values of 1 in the original image to be included in a proximal, larger group of pixels having values of 0.

In one example, the tissue detector 204 downsamples an image having 40× magnification by a ratio of 16×, so the magnification of the resulting downsampled image is 40/16× and each pixel in the downsampled image represents 16 pixels in the original image.

In one example, the tissue detector 204 detects the boundaries of each object on the slide as a cluster of pixels having binary or RGB values that do not equal zero, surrounded by pixels with RGB values equal to zero, indicating an object border. If the pixels forming the boundaries lie on a relatively straight line, the tissue detector 204 classifies the object as non-tissue. For example, the tissue detector 204 outlines a shape with a closed polygon. If the number of vertices of the polygon is less than a user-defined minimum vertices threshold, the polygon is deemed to be a simple, inorganic shape that is too smooth, and marked as non-tissue.

Figure 5A:
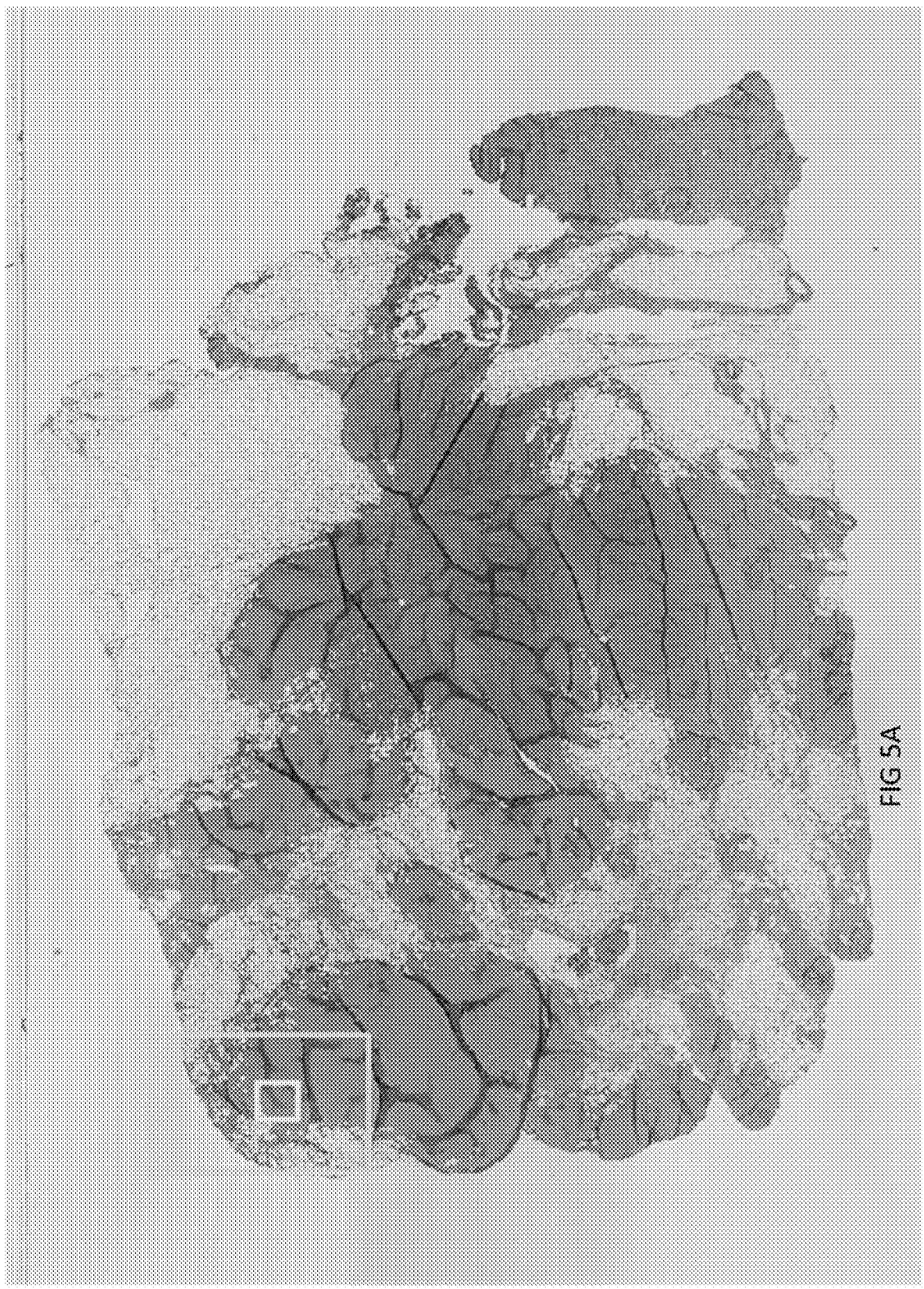
FIGS. 5A, 5B, and 5C each illustrate an exemplary grid overlay used for tissue segmentation on a digital image of a histology slide, in accordance with an example.
Figure 5B:
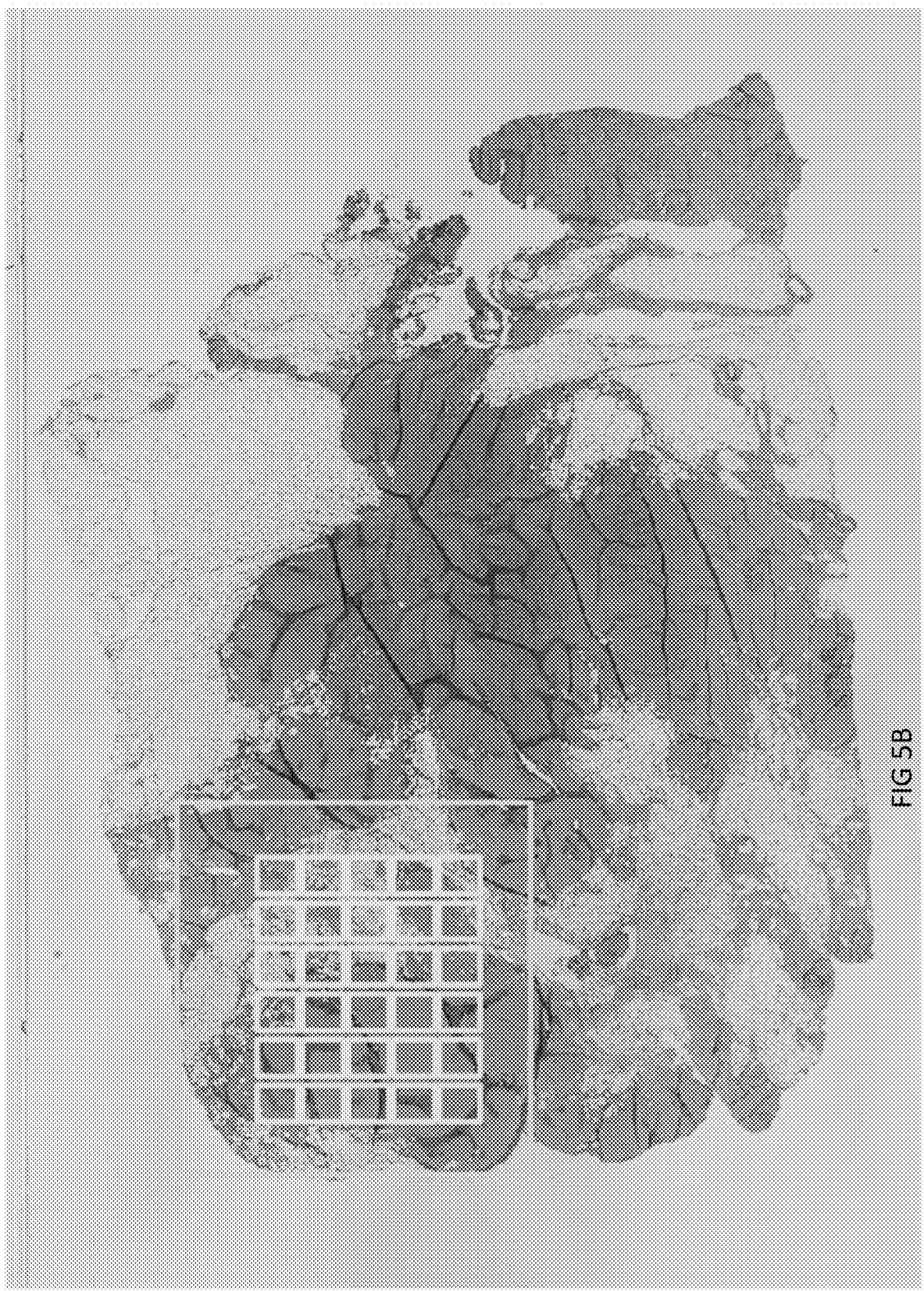
Figure 5C:
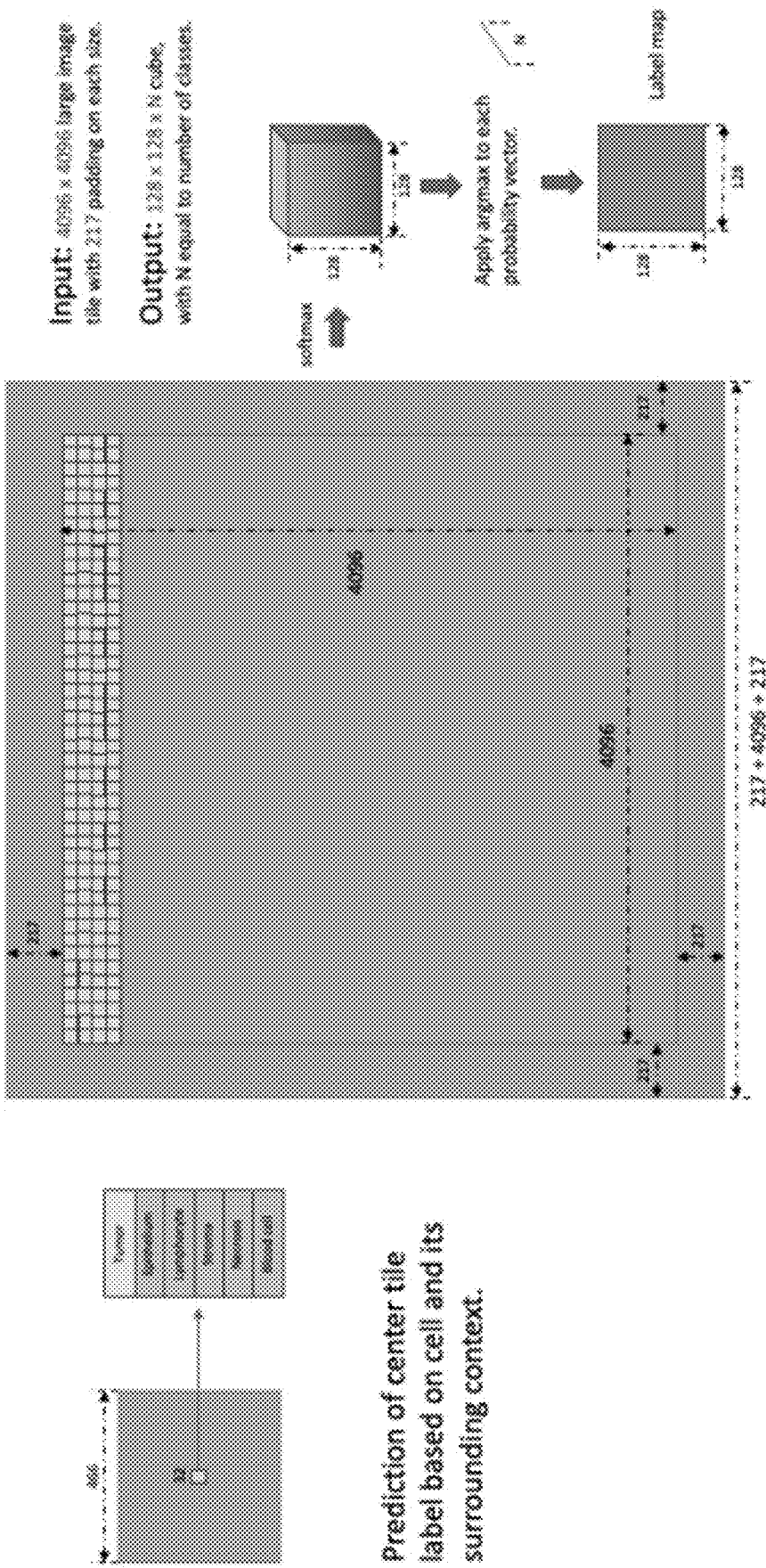

FIGS. 5A, 5B, and 5C illustrate an exemplary grid overlay on a digital image of a histology slide for tissue classification. FIGS. 5A and 5B show examples of how a multi-field-of-view image tile input looks. FIG. 5A is the input image used to get prediction result of single central small tile. FIG. 5B is the input of image to get prediction results of a matrix of central small tiles. The grid overlays shown in FIGS. 5A and 5B, represent the tiling of the image that is performed by the PhiNet architecture, as described herein, e.g., at FIG. 6A. In FIG. 5A, a single tile (teal) and it's center (yellow) are shown. In FIG. 5B, shown is a grid of tiles, which is what is actually input into PhiNet architecture for inference. The PhiNet architecture processes each of the tiles in parallel, where each of the little yellow center squares receives a probability for each possible class (summing to 100% as described herein). FIG. 3A shows one possible output overlay map for a breast cancer model. There are as many overlay maps as there are models that may be displayed. For example, if the techniques include breast, colorectal, and lung models, then 3 overlay maps may be generated, and the techniques can also show the heat map (probability map) for a single class overlaid over the image.

After eliminating non-tissue pixels from the image, the tissue detector 204 stores data containing the locations of the remaining pixels representing tissue. In one example, the locations are stored as an image of the remaining pixels which could be a grayscale mask, a list of the locations of each vertex of the polygons that surround the remaining pixels, and/or other coordinates that indicate the locations of the tissue pixels.

The tissue class tile grid projector 208 receives the data containing the locations of the pixels representing tissue and overlays a tile grid over these pixels. In one example, the grid is composed of small square tiles that do not overlap.

The tissue class locator 216 includes a tissue classification algorithm (see FIGS. 6A through 6C) that assigns a tissue class label to the image represented in each small square tile. In one example, the digital tissue segmenter 201 may report the assigned tissue class label associated with each small square tile by displaying a grid-based digital overlay map in which each tissue class is represented by a unique color (see FIG. 3A).

A smaller tile size may cause an increase in the amount of time required for the tissue class locator 216 to analyze the input image. Alternatively, a larger tile size may increase the likelihood that a tile will contain more than one tissue class and make it difficult to assign a single tissue class label to the tile. In this case, the tissue class locator 216 may calculate an equal probability for two or more tissue class labels being accurately assigned to a single small square tile instead of calculating that one of the tissue class labels has a higher probability of describing the image in the small square tile, compared to the other tissue class labels.

In one example, each side of each small square tile is approximately 32 microns long and approximately 5-10 cells fit in each small square tile. This small tile size allows the algorithm to create more spatially accurate borders when determining the boundary between two neighboring small square tile regions that depict two distinct tissue classes. In one example, each side of the small square tile can be as short as 1 micron.

In one example, the size of each tile is set by the user to contain a specific number of pixels. In this example, the resolution of the input image will determine the length of each side of the tile, as measured in microns. At different resolutions, the micron length of the tile side will vary and the number of cells in each tile may vary.

The algorithm recognizes various pixel data patterns in the portion of the digital image that is located within or near each small square tile and assigns a tissue class label to each small square tile based on those detected pixel data patterns. In one example, a medium square tile centered around a small square tile contains the area of a slide image that is close enough to the small square tile to contribute to the label assignment for that small square tile.

In one example, each side of a medium square tile is approximately 466 microns long, and each medium square tile contains approximately 225 (15×15) small square tiles. In one example, this medium tile size increases the likelihood that structural tissue features can fit within a single medium tile and provide context to the algorithm when labeling the central small square tile. Structural tissue features may include glands, ducts, vessels, immune clusters, etc.

In one example, this medium tile size is selected to counteract the shrinkage that occurs during convolution.

During convolution, an input image matrix is multiplied by a filter matrix to create a result matrix, and shrinkage refers to a case where the result matrix is smaller than the input image matrix. The dimensions of a filter matrix in a convolution layer affects the number of rows and columns lost to shrinkage. The total number of matrix entries that are lost to shrinkage by processing an image through a particular CNN can be calculated depending on the number of convolution layers in the CNN and the dimensions of the filter matrices in each convolution layer. (See FIGS. 6A through 6C)

In the example shown in FIG. 6B, the convolution layers in combination lose 217 total matrix rows or columns from the top, bottom, and two side edges of the matrix, so the medium square tile is set to equal the small square tile plus 217 pixels on each side of the small square tile.

In one example, two neighboring small square tiles share a side and are each at the center of a medium square tile. The two medium square tiles overlap. Of the 466*466 small pixels located in each medium square tile, the two medium square tiles will share all but 32*466 pixels. In one example, each convolution layer of the algorithm (see FIGS. 6A through 6B) analyzes both medium square areas simultaneously such that the algorithm produces two vectors of values (one for each of the two small square tiles).

The vector of values contains a probability value for each tissue class label, indicating the likelihood that the small square tile depicts that tissue class. The vectors of values will be arranged in a matrix, to form a 3-dimensional probability data array. The location of each vector in the 3-dimensional probability data array, relative to the other vectors, will correspond to the location of the associated small square tile, relative to the other small square tiles included in the algorithm analysis.

In the example, 434×434 (188,356) of the 466×466 (217,156) pixels in each medium square tile are common to both medium square tiles. By analyzing both medium square tiles simultaneously, the algorithm increases efficiency.

In one example, the algorithm can further increase efficiency by analyzing a large tile formed by multiple overlapping medium square tiles, each of which contains many small square tiles surrounding one center small square tile that receives a tissue class label. In this example, the algorithm still generates one data structure in the form of a 3-dimensional probability data array containing one vector of probabilities for each small square tile, wherein the location of the vector within the 3-dimensional array corresponds to the location of the small tile within the large tile.

The tissue class locator 216 saves this 3-dimensional probability data array and the overlay map generator 224 converts the tissue class label probabilities for each small square tile into a tissue class overlay map. In one example, the overlay map generator 224 may compare the probabilities stored in each vector to determine the largest probability value associated with each small square tile. The tissue class label associated with that largest value may be assigned to that small square tile and only the assigned labels will be displayed in the tissue class overlay map.

In one example, matrices generated by each layer of the tissue class locator 216 for the large square tile are stored in graphics processing unit (GPU) memory. The capacity of the GPU memory and the amount of GPU memory required for each entry in the 3-dimensional probability data array may determine the maximum possible size of the large square tile. In one example, the GPU memory capacity is 250 MB and each entry in the matrices requires 4 bytes of GPU memory. This allows a large tile size of 4,530 pixels by 4,530 pixels, calculated as follows: 4 bytes/entry*4530*4530*3 entries for each large tile=246 (~250) MB of GPU memory required per large square tile. In another example, each entry in the matrices requires 8 bytes of GPU memory. In this example, a 16 GB GPU can process 32 large tiles simultaneously, each large tile having dimensions of 4,530 pixels by 4,530 pixels, calculated as follows: 32 large tiles*8 bytes/entry*4530*4530*3 entries for each large tile=14.7 (~16) GB of GPU memory required.

In one example, each entry in the 3-dimensional probability data array is a single precision floating-point format (float32) data entry.

In one example, there are 16,384 ($128^2$) non-overlapping small square tiles that form a large square tile. Each small square tile is the center of a medium square tile having sides that are each approximately 466 pixels long. The small square tiles form a center region of a large square tile having sides that are each approximately 4,096 pixels long. The medium square tiles all overlap and create a border around all four sides of the center region that is approximately 217 pixels wide. Including the border, each large square tile has sides that are each approximately 4,530 pixels long. (See FIG. 5C)

In this example, this large square tile size allows simultaneous calculations that reduce the redundant computation percentage by 99%. This may be calculated as follows: first, select a pixel on the interior of a large square tile (any pixel at least 434 pixels from the edge of the large square tile). Construct a region that is the size of a medium square tile (466 pixels per edge) with this model pixel at the center. Then for any small square tile centered within this constructed region, the model pixel is contained within that small square tile's corresponding medium square tile. There are (466/32)^2=~217 such small square tiles within the large square tile. For pixels not on the interior of the large square tile, the number of small square tiles that satisfy this condition is smaller. The number decreases linearly as the distance between the selected small square tile and the edge of the large square tile decreases, then again as the distance between the selected small square tile and the corner decreases, where a small number of pixels (~0.005%) only contribute towards the classification of a single small square tile. Performing classification on a single large square tile means the computations for each pixel are only performed once, instead of once per small square tile. Thus, the redundancy is reduced by nearly 217-fold. In one example, redundancy is not completely eliminated because a slide may contain several large square tiles, each of which may overlap slightly with its neighbors.

An upper bound on the redundant calculation percentage can be established (slight deviation from this upper bound depends on the number of large square tiles needed to cover the tissue and the relative arrangement of these tiles). The redundancy percentage is $1-1/r$ where r is the redundancy ratio, and r can be calculated as $(T/N+1)(sqrt(N)*E+434)^2/(sqrt(T)*E+434)^{1/2}$; T is the total number of small square tiles on the slide, N is the number of small square tiles per large square tile, and E is the edge size of the small square tiles.

Figure 6A:
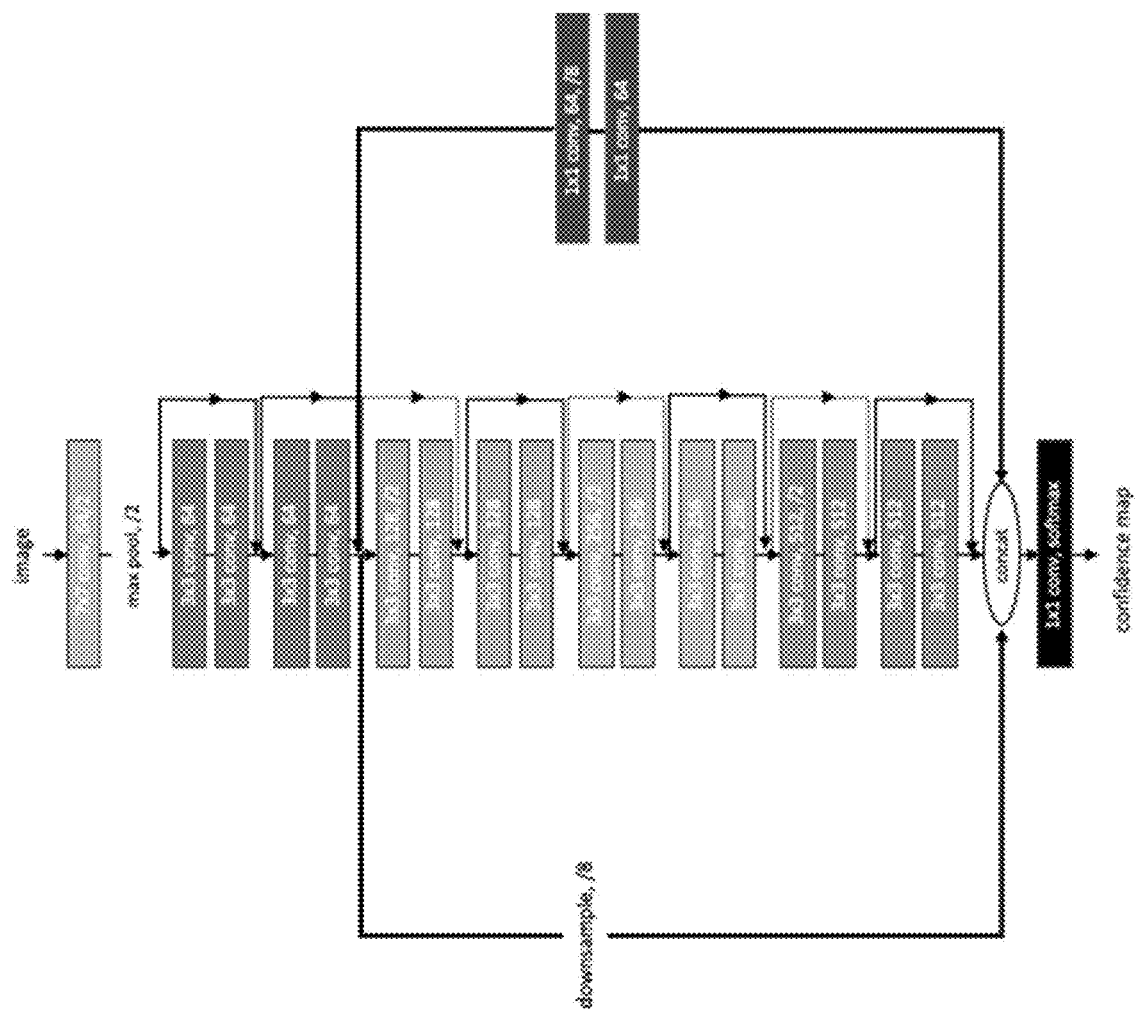
FIG. 6A illustrates the layers of an exemplary tissue segmentation algorithm, in accordance with an example.

FIG. 6A illustrates the layers of an example tissue segmentation algorithm. FIG. 6B compares the layers of a known image classification algorithm with an example tissue segmentation algorithm.

In one example, the tissue class locator 216 includes a convolutional neural network (CNN), a deep learning algorithm that has been trained by a training set to recognize pixel data patterns.

In one example, the tissue class locator 216 includes a tile-resolution fully convolutional network (FCN) black box deep learning model based on a known CNN ResNet-18 image recognition model. In one example, the tile-resolution FCN is a multi-tile algorithm known as PhiNet, the layers of which are shown in FIG. 6A.

FIG. 6B illustrates the differences between the ResNet-18 algorithm on the left, and the tile-resolution FCN PhiNet shown in FIG. 6A and on the right half of FIG. 6B. Compared to the ResNet-18 algorithm, the tile-resolution FCN PhiNet included in the digital tissue segmenter 201 has additional layers of 1×1 convolution in a skip connection, downsampling by a factor of 8 in a skip connection, and a confidence map layer, and replaces an average pooling layer with a concatenation layer, and a fully connected (fc N) layer with a 1×1 convolution and softmax layer.

The added layers convert a classification task into a classification-segmentation task. This means that instead of receiving and classifying a whole image as one tissue class label, the added layers allow the tile-resolution FCN to classify each small tile in the user-defined grid as a tissue class.

These added and replacement layers convert a CNN to a tile-resolution FCN without requiring the upsampling performed in the later layers of traditional pixel-resolution FCNs. Upsampling is a method by which a new version of an original image can be created with a higher resolution value than the original image. Upsampling is a time-consuming, computation-intense process.

There are many methods known in the art for upsampling, including nearest-neighbor, bilinear, hermite, bell, Mitchell, bicubic, and Lanczos resampling. In one example, 2× upsampling means that a pixel with red green blue (RGB) values will be split into four pixels, and the RGB values for the three new pixels may be selected to match the RGB values of the original pixel. In another example, the RGB values for the three new pixels may be selected as the average of the RGB values from the original pixel and the pixels that are adjacent to the neighboring pixel.

Because the RGB values of the new pixels may not accurately reflect the visible tissue in the original slide that was captured by the digital slide image, upsampling can introduce errors into the final image overlay map produced by the overlay map generator 224.

Additionally, traditional pixel-resolution FCNs require training data wherein each pixel is labeled, which is not feasible to produce from digital histology slides because it is too time consuming and because each individual pixel does not contain enough contextual information to identify a tissue class.

In one example, instead of labeling individual pixels, the tile-resolution FCN is programmed to analyze a large square tile made of small square tiles (see FIG. 5C), producing a 3D array of values that each represent the probability that one tissue class classification label matches the tissue class depicted in each small tile.

A convolution layer, known in the art, performs the multiplication of at least one input image matrix by at least one filter matrix. In the first convolution later, the input image matrix has a value for every pixel in the large square tile input image, representing visual data in that pixel (for example, a value between 0 and 255 for each channel of RGB).

The filter matrix has dimensions selected by the user, and may contain weight values selected by the user or determined by backpropagation during CNN model training. In one example, in the first convolution layer, the filter matrix dimensions are 7×7 and there are 64 filters. The filter matrix may represent visual patterns that can distinguish one tissue class from another.

In an example where RGB values populate the input image matrix, the input image matrix and the filter matrices will be 3-dimensional. (See FIG. 6C)

Each filter matrix is multiplied by each input image matrix to produce a result matrix. All result matrices produced by the filters in one convolution layer may be stacked to create a 3-dimensional result matrix having dimensions such as rows, columns, and depth. The last dimension, depth, in the 3-D result matrix will have a depth equal to the number of filter matrices.

The result matrix from one convolution layer becomes the input image matrix for the next convolution layer.

A convolution layer title that includes "In", where n is a number, indicates that there is a downsampling (also known as pooling) of the result matrix produced by that layer. The n indicates the factor by which the downsampling occurs. Downsampling by a factor of 2 means that a downsampled result matrix with half as many rows and half as many columns as the original result matrix will be created by replacing a square of four values in the result matrix by one of those values or a statistic calculated from those values. For example, the minimum, maximum, or average of the values may replace the original values.

The algorithm shown also adds skip connections (shown in FIG. 6A as black lines with arrows that connect blue convolution layers directly to the concatenation layer). The skip connection on the left includes downsampling by a factor of 8, and the skip connection on the right includes two convolution layers that multiply an input image matrix by filter matrices that each have dimensions of 1×1. Because of the 1×1 dimensions of the filter matrices in these layers, only an individual small square tile contributes to its corresponding probability vector in the result matrices created by the purple convolution layers. These result matrices represent a small focus of view.

In all of the other convolution layers, the larger dimensions of the filter matrices allow the pixels in each medium square tile, including the small square tile at the center of the medium square tile, to contribute to the probability vector in the result matrix that corresponds with that small square tile. These result matrices allow the contextual pixel data patterns surrounding the small square tile to influence the probability that each tissue class label applies to the small square tile. These result matrices represent a large focus of view.

The 1×1 convolution layers in the skip connection allow the algorithm to regard the pixel data patterns in the center small square tile as more or less important than pixel data patterns in the rest of the surrounding medium square tile. This is reflected by the weights that the trained model multiplies by the final result matrix from the skip connection layers (shown on the right side of FIG. 6A) compared to the weights that the trained model multiplies by the final result matrix from the medium tile convolution layers (shown in the center column of FIG. 6A) during the concatenation layer.

The downsampling skip connection shown on the left side of FIG. 6A creates a result matrix with a depth of 64. The 3×3 convolution layer having 512 filter matrices creates a result matrix with a depth of 512. The 1×1 convolution layer having 64 filter matrices creates a result matrix with a depth of 64. All three of these results matrices will have the same number of rows and the same number of columns. The concatenation layer concatenates these three results matrices to form a final result matrix with the same number of rows and the same number of columns as the three concatenated matrices, and a depth of 64+512+64 (640). This final result matrix combines the large and small focus of view matrices.

The final result matrix may be flattened to 2 dimensions by multiplying a factor by every entry, and summing the products along each depth. Each factor may be selected by the user, or may be selected during model training by backpropagation. Flattening will not change the number of rows and columns of the final results matrix, but will change the depth to 1.

The 1×1 convolution layer receives the final result matrix and filters it with one or more filter matrices. The 1×1 convolution layer may include one filter matrix associated with each tissue class label in the trained algorithm. This convolution layer produces a 3-D result matrix that has a depth equal to the number of tissue class labels. Each depth corresponds to one filter matrix and along the depth of the result matrix there may be a probabilities vector for each small square tile. This 3-D result matrix is the 3-dimensional probability data array, and the 1×1 convolution layer stores this 3-D probability data array.

A softmax layer may create a 2-dimensional probability matrix from the 3-D probability data array by comparing every value in each probabilities vector and selecting the tissue class associated with the maximum value to assign that tissue class to the small square tile associated with that probabilities vector.

The stored 3-dimensional probability data array or the 2-D probability matrix may then be converted to a tissue class overlay map in the final confidence map layer in FIG. 6A, to efficiently assign a tissue class label to each tile.

In one example, to counteract shrinkage, input image matrices have added rows and columns on all four outer edges of the matrices, wherein each value entry in the added rows and columns is a zero. These rows and columns are referred to as padding. In this case, the training data input matrices will have the same number of added rows and columns with value entries equal to zero. A difference in the number of padding rows or columns in the training data input matrices would result in values in the filter matrices that do not cause the tissue class locator 216 to accurately label input images.

In the FCN shown in FIG. 6B, 217 total outer rows or columns on each side of the input image matrix will be lost to shrinkage before the skip connection, due to the gray and blue layers. Only the pixels located in the small square tiles will have a corresponding vector in the result matrices created by the green layers and beyond.

In one example, each medium square tile is not padded by adding rows and columns with value entries of zero around the input image matrix that corresponds to each medium square tile because the zeroes would replace image data values from neighboring medium square tiles that the tissue class locator 216 needs to analyze. In this case, the training data input matrices will not be padded either.

Figure 6C:
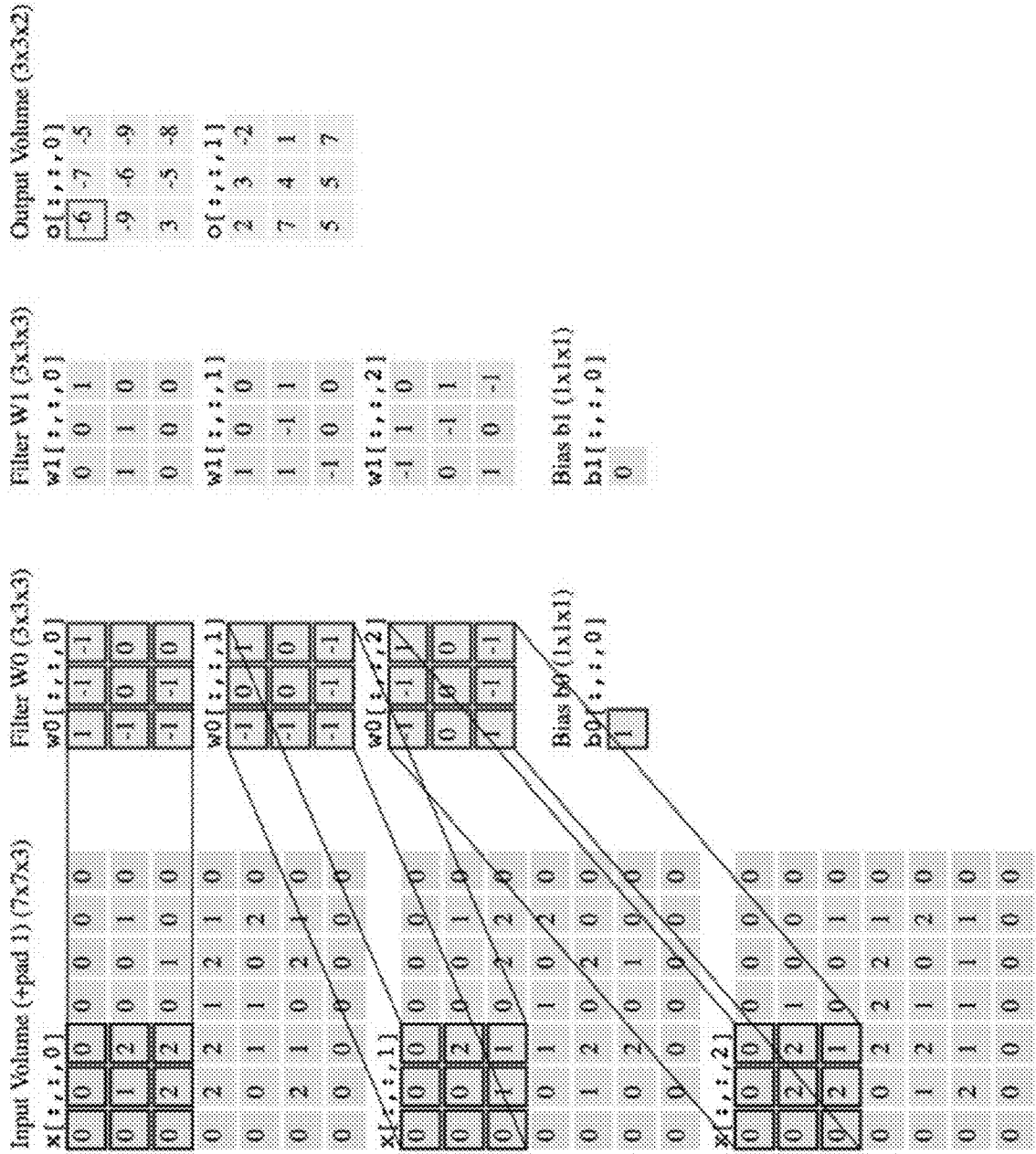
FIG. 6C is a visualization of the layers of an exemplary 3-dimensional input image matrix being convoluted by two exemplary 3-dimensional filter matrices, in accordance with an example.

FIG. 6C is a visualization of each depth of an exemplary 3-dimensional input image matrix being convoluted by two exemplary 3-dimensional filter matrices.

In an example where an input image matrix contains RGB channels for each medium square tile, the input image matrix and filter matrices will be 3-dimensional. In one of the three dimensions, the input image matrix and each filter matrix will have three depths, one for red channel, one for green channel, and one for blue channel.

The red channel (first depth) of the input image matrix is multiplied by the corresponding first depth of the first filter matrix. The green channel (second depth) is multiplied in a similar fashion, and so on with the blue channel (third depth). Then, the red, green, and blue product matrices are summed to create a first depth of the 3-dimensional result matrix. This repeats for each filter matrix, to create an additional depth of the 3-dimensional result matrix that corresponds to each filter.

A variety of training sets may be used to train a CNN or FCN that is included in the tissue class locator 216.

In one example, the training set may contain JPEG images of medium square tiles, each having a tissue class label assigned to its center small square tile, taken from at least 50 digital images of histology slides at a resolution of approximately 1 pixel per micron. In one example, a human analyst has outlined and labeled all relevant tissue classes or labeled each small square tile in each histology slide as non-tissue or as a specific type of cells. Classes of tissue may include tumor, stroma, normal, immune cluster, necrosis, hyperplasia/dysplasia, and red blood cells. In one example, each side of each center small square tile is approximately 32 pixels long.

In one example, the training set images are converted to input training image matrices and processed by the tissue class locator 216 to assign a tissue class label to each training set image. If the tissue class locator 216 does not accurately label the validation set of training images to match the corresponding annotations added by a human analyst, the weights of each layer of the deep learning network may be adjusted automatically by stochastic gradient descent through backpropagation until the tissue class locator 216 accurately labels most of the validation set of training images.

In one example, the training data set has multiple classes where each class represents a tissue class. That training set will generate a unique model with specific hyperparameters (number of epochs, learning rate, etc.) that can recognize and classify the content in a digital slide image into different classes. Tissue classes may include tumor, stroma, immune cluster, normal epithelium, necrosis, hyperplasia/dysplasia, and red blood cells. In one example, the model can classify an unlimited number of tissue classes, provided each tissue class has a sufficient training set.

In one example, the training set images are converted into grayscale masks for annotation where different values (0-255) in the mask image represent different classes.

Each histology slide can exhibit large degrees of variation in visual features, including tumor appearance, so a training set may include digital slide images that are highly dissimilar to better train the model for the variety of slides that it may analyze.

A training set may also be specific to a cancer type. In this case, all of the histology slides that generated the digital images in a particular training set contain a tumor sample from the same cancer type. Cancer types may include breast, colorectal, lung, pancreatic, liver, stomach, skin, etc. Each training set may create a unique model specific to the cancer type. Each cancer type may also be split into cancer subtypes, known in the art.

In one example, a training set may be derived from histology slide pairs. A histology slide pair includes two histology slides that each have one slice of tissue, wherein the two slices of tissue were adjacent in the tumor sample. Therefore, the two slices of tissue are substantially similar. One of the slides in the pair is stained with H and E staining only, and the other slide in the pair is stained with IHC staining for a specific molecule target. The areas on the H and E stained slide that correspond to areas where IHC staining appears in the paired slide are annotated by a human analyst as containing a specific molecule target and the tissue class locator receives the annotated H and E slides as a training set.

In this case, the trained tissue class locator 216 receives digital images of H and E stained tissue to predict tiles that may contain a given molecule target and the overlay map generator 224 produces an overlay map showing which tiles contain a given molecule. In one example, the resolution of the overlay is at the level of an individual cell.

The overlay produced by a model trained by one or more training sets may be reviewed by a human analyst in order to annotate the digital slide image to add it to one of the training sets.

The pixel data patterns that the algorithm detects may represent visually detectable features. Some examples of those visually detectable features may include color, texture, cell size, shape, and spatial organization.

For example, color on a slide provides contextual information. An area on the slide that is purple has a higher density of cells and is more likely to be invasive tumor. Tumor also causes the surrounding stroma to become more fibrous in a desmoplastic reaction, which causes normally pink stroma to appear blue-grey. Color intensity also helps to identify individual cells of a certain type (for example, lymphocytes are uniformly very dark blue).

Texture refers to the distribution of stain within cells. Most tumor cells have a rough, heterogeneous appearance, with light pockets and dark nucleoli within their nuclei. A zoomed-out field of view with many tumor cells will have this rough appearance. Many non-tumor tissue classes each has distinguishing features. Furthermore, patterns of tissue classes that are present in a region can indicate the type of tissue or cell structures present in that region.

Additionally, cell size often indicates tissue class. If a cell is several times larger than normal cells elsewhere on the slide, the probability is high that it is a tumor cell.

The shape of individual cells, specifically how circular they are, can indicate what type of cell they are. Fibroblasts (stromal cells) are normally elongated and slim, while lymphocytes are very round. Tumor cells can be more irregularly shaped.

The organization of a group of cells can also indicate tissue class. Frequently, normal cells are organized in a structured and recognizable pattern, but tumor cells grow in denser, disorganized clusters. Each type and subtype of cancer can produce tumors with specific growth patterns, which include cell location relative to tissue features, the spacing of tumor cells relative to each other, formation of geometric elements, etc.

Figure 7:
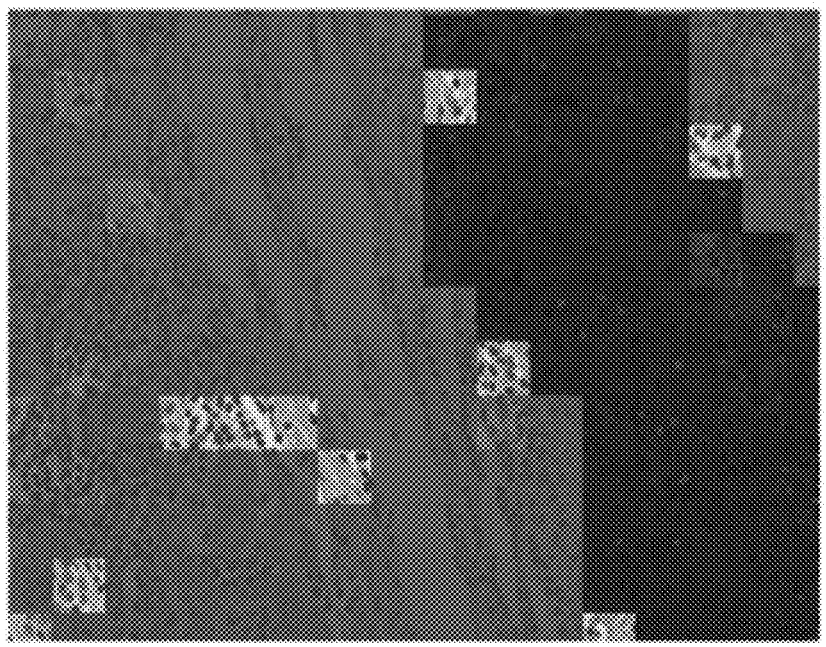
FIG. 7 illustrates an exemplary grid overlay showing lymphocyte detections (little red dots) and the tile classifications, in accordance with an example.

FIG. 7 illustrates an example of a first classification model for labeling an H&E Slide or IHC Slide using tile classifications and cell classifications. As shown, an exemplary model overlay may include red tiles for identifying clusters of lymphocytes, green tiles for identifying epithelium cells, and dark blue tiles for identifying tumor cells. The tile classifications are shown in the legend and generated using a PhiNet model architecture. The cell legend showing an example cell classification is shown, as generated used a UNet model architecture. In some examples, where a tile has a predicted tile classification and that tile corresponds to identified cell (i.e., cell object) with a classification, the cell classification may override, such that the segmenter 201 assigns the cell classification to that tile in place of the tile classification. In another example, an exemplary overlay may represent individual lymphocytes by coloring them red to distinguish between clusters of lymphocytes and individual lymphocytes infiltrating other tissues. In one example, individual lymphocytes detected within tumor tiles represent tumor-infiltrating lymphocytes which would be red dots within dark blue or green tiles.

In one example, the cell type locator 220 includes at least one cell outlining algorithm for detecting the outer edge of each cell and reporting the coordinates of every pixel that contains an outer edge of a cell to create a cell outer edge overlay map. (See FIG. 2B)

The cell type tile grid projector 212 may overlay a grid on the digital image of a histology slide. A smaller tile size may improve the training data set by increasing the number of tiles in the training data set, and may be easier for a human analyst to visually inspect before training the cell type locator 220. The size of the tiles may be determined by the capacity of the memory.

The cell type locator 220 may recognize features that include changes in color and brightness between adjacent pixels, and the shape of areas with changes in color or brightness. The cell type locator 220 may also report the coordinates of the center of each detected cell and of all vertices of a polygon that encloses a single detected cell. The cell type locator 220 may include a radial symmetry filter or an edge detector such as a Laplacian edge filter or a Sobel edge filter. In one example, the cell type locator 220 is a UNet model, which is a three-class semantic segmentation FCN model.

In one example, the UNet is a three-class model, which means that the algorithm may classify each pixel as either background exterior to every cell, cell outer edge, or cell interior. This facilitates the counting of each individual cell, especially when two or more cells overlap each other. In one example, tumor infiltrating lymphocytes will overlap tumor cells. In traditional two-class cell outlining models that only label whether a pixel contains a cell outer edge or not, each clump of two or more overlapping cells would be counted as one cell. Two-class UNet models with binary classification (cell vs background) are known in the art, but the three-class UNet model allows a type of classification that is not binary, which requires adaptation with the use of a different loss function. The classified results may be stored as matrix with different values to indicate cell exterior, cell outer edge, and cell interior. A training process is done by having an original image and a mask image together as input to a UNet model (e.g., the mask may be an image with pixel values at 0, 128 and 255, where 0 represent cell exterior, 128 represent cell outer edge, 255 represent cell interior).

In one example, to avoid the possibility that a cell that spans two tiles is counted twice, the algorithm may add a buffer around all four sides of each tile that is slightly wider than an average cell. The intention is to only count cells that appear in the center, non-buffered region for each tile. In this case, tiles will be placed so that the center, non-buffered region of neighboring tiles are adjacent and non-overlapping. Neighboring tiles will overlap in their respective buffer regions.

In one example, the cell segmentation algorithm includes two UNet models. One UNet model may be trained with images patches of mixed tissue classes, where a human analyst has highlighted a bounding polygon for each cell and classified each cell according to tissue class. In one example, training data includes digital slide images where every pixel has been labeled as either the interior of a cell, the outer edge of a cell, or the background which is exterior to every cell. In another example, the training data includes digital slide images where every pixel has been labeled with a yes or no to indicate whether it depicts the outer edge of a cell. The labels may be two-dimensional matrices with the same shapes as their corresponding image patches, where each matrix element takes on one of several values (the exact number of values is determined by the number of unique classes in the model).

Another UNet model may be trained with images of many cells of a single tissue class, or images of a diverse set of cells where cells of only one tissue class are outlined in a binary mask. In one example, the training set is labeled by associating a first value with all pixels showing a cell type of interest, a second value to all background pixels, and optionally a third value to pixels along the border of each cell (in the case of a three-class model instead of a two-class model). Visually, an image labeled in this way might appear as a black and white image wherein all pixels showing a tissue class of interest would be white and all other pixels would be black, or vice versa. (See FIG. 8) For example, the images may have only labeled lymphocytes. This UNet model can recognize the outer edges of that particular cell type and assign a label to cells of that type in the digital image of the slide.

In one example, a non-UNet model may be used instead of a UNet model to label cells that are detected by a first UNet model. This non-UNet model could be another CNN that has a different architecture, or a non deep learning model like random forest or support vector machine.

In one example, the cell labels generated by the cell type locator 220 can be augmented by the tissue region labels generated by the tissue class locator 216. If a cell is detected but not labeled a specific class by the cell type locator, it may be assigned a default label that is the label of the tissue region in which it is found.

In one example, the images in both training sets have a resolution of 2 pixels per micron.

The techniques herein, applying PhiNet architecture as described, may be used to predict other indicators, as well, such as microsatellite instability (MSI), consensus molecular subtypes (CMS), and other molecular biomarkers. Classification models may be trained to predict from H&E slides these biomarkers, using other additional information, such as other characteristics of the patient that may be included in the patient's electronic health record. Other biomarkers that can be predicted using trained PhiNet architecture include: tumor grade and/or stage, tumor origin (for TUO cases), histological subtypes (such as adenocarcinoma and squamous cell carcinoma), other biomarkers such as cell based, vaccine, or cytokine therapies).

Figure 9:
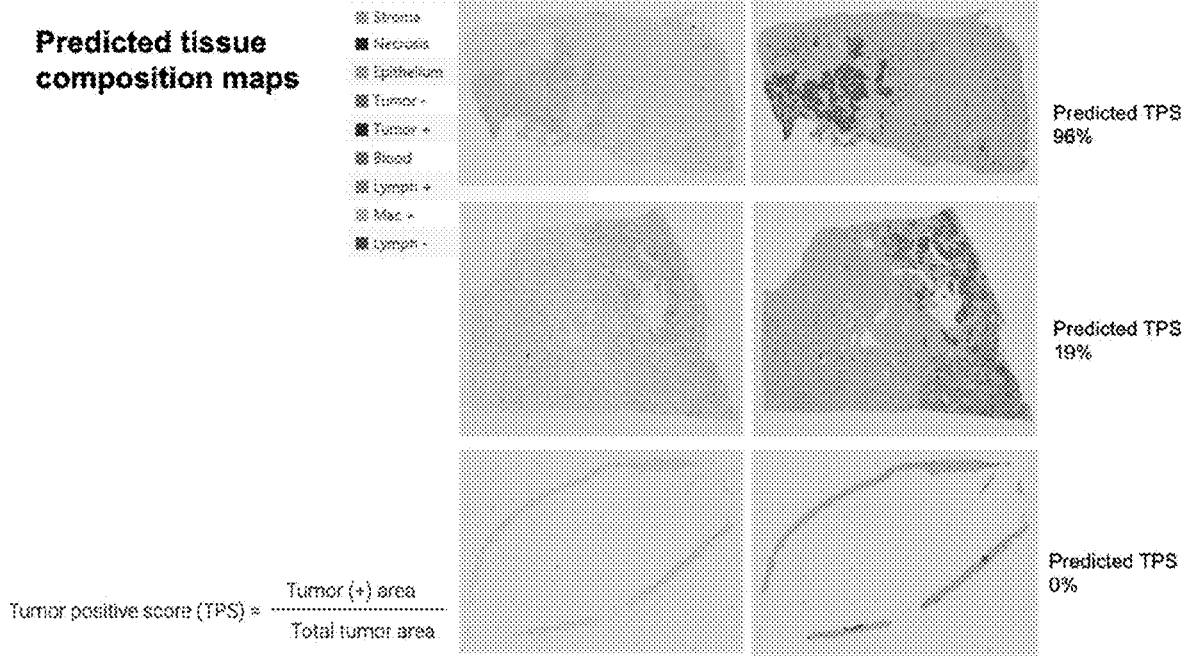
FIG. 9 illustrates example overlay maps identifying a programmed death ligand 1 (PD-L1) tumor positive score (TPS) using different immunohistochemical (IHC) stain images, in accordance with an example.

Further, wherein exemplary embodiments disclosed herein are illustrated with H&E slides prepared by a pathologist, similar models may be generated for IHC slides as well. Exemplary IHC overlays may classify tiles according to a status of PD-L1 'presence' in the cell. In an example implementation, a digital tissue segmenter similar to that of segmenter 201 in FIG. 2 may be configured to as a digital PD-L1 tumor positive score (TPS) predictor. In an example, this PD-L1 TPS digital tissue segmenter includes a tissue detector, tissue class tile grid projector, and tissue class locator, like that of segmenter 201 in FIG. 2. The output of the tissue class locator 216 may be provided to a PD-L1 TPS metric calculator and overlay map generator (replacing the element 224 in the segmenter 201) configured to count the number of Tumor + tiles and divide by the total number of tumor tiles (i.e., the sum of Tumor + and Tumor − tiles), to determine a predicted PD-L1 TPS. Other quantities can also be calculated, such as the percent of stained lymphocytes or overall macrophage percentage. The PD-L1 tissue classifier in this example may be configured to predict any number of classes, including blood, epithelium, lymphocyte +, lymphocyte −, macrophage +, necrosis, stroma, tumor +, and tumor −, where "+" indicates positive PD-L1 expression and "−" indicates no PD-L1 expression. In this way, in some examples, a PD-L1 prediction process can be implemented by a digital tissue image segmenter implementing two main processes. First, the digital tissue image segmenter predicts different tissue classes overlaid onto an IHC image (i.e., a similar process as described in reference to H&E images described herein, but with different classes). Second, the digital tissue image segmenter obtains PD-L1 TPS by counting the number of predicted Tumor + tiles and dividing that by the total number of Tumor tiles (i.e. Tumor + added to Tumor −). An example overlay mapping process that may be performed by such a digital PD-L1 tumor positive score (TPS) predictor is shown in FIG. 9, showing different predicted tissue classifications. On the left are various IHC images and on the right are predicted TPS various of different tissue classifications overlayed on the IHC images.

Figure 10:
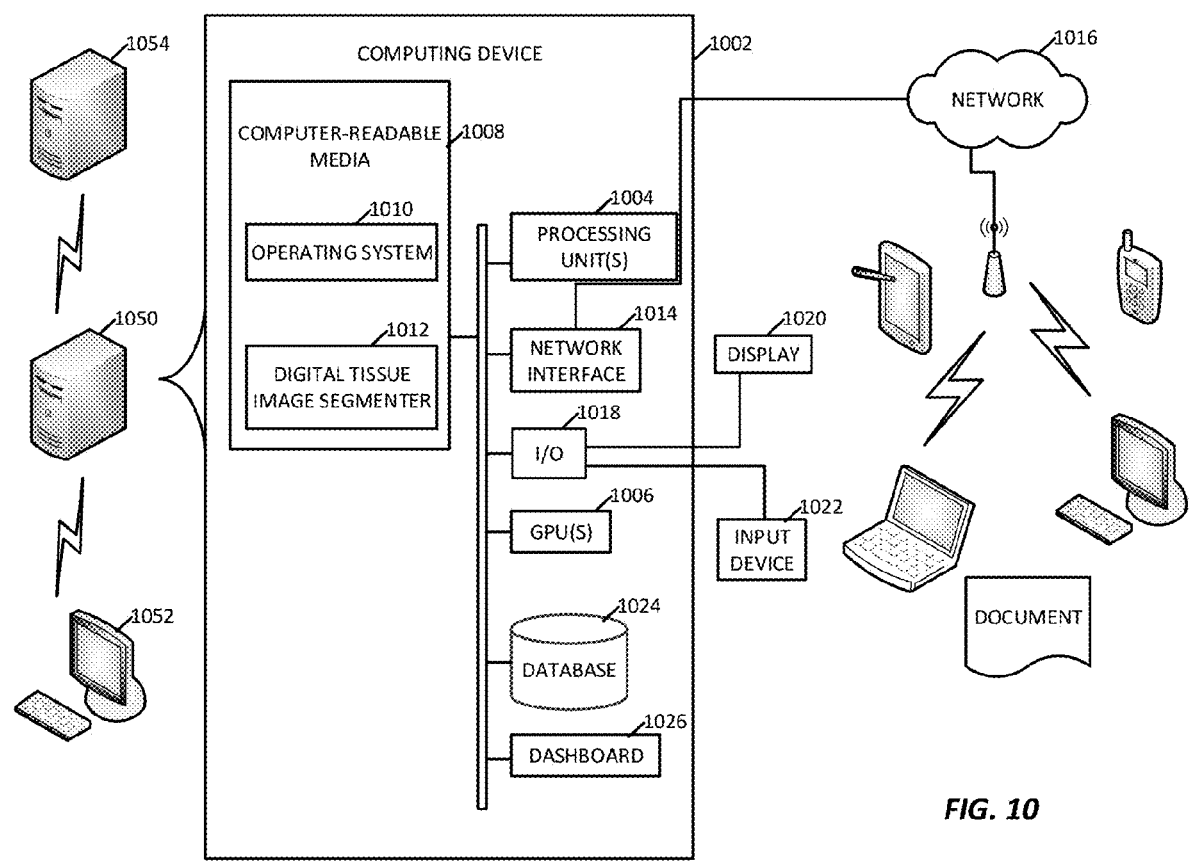
FIG. 10 a schematic illustration of an example computer processing system having a digital tissue image segmenter for performing techniques and methods herein, in accordance with an example.

FIG. 10 illustrates a system 1000 for performing the methods described herein may include a computing device 1002, and more particularly may be implemented on one or more processing units 1004, e.g., Central Processing Units (CPUs), and/or on one or more Graphical Processing Units (GPUs) 1006, including clusters of CPUs and/or GPUs. Features and functions described may be stored on and implemented from one or more non-transitory computer-readable media 1008 of the computing device. The computer-readable media 1008 may include, for example, an operating system 1010 and software modules, or "engines," that implement the methods described herein, including a digital tissue image segmenter 1012 implementing methods and processing illustrated and described herein. Example processes include tissue detection, tissue class tile grid projection, cell type tile grid projection, tissue class locator, cell type locator, overlay map generator and metric calculator processes. More generally, the computer-readable media 1008 may store batch normalization process instructions for the engines for implementing the techniques herein. The computing device 1002 may be a distributed computing system, such as an Amazon Web Services cloud computing solution. The computing device 1002 may be implemented on one network accessible processing device 1050 or distributed across multiple such devices 1050, 1052, 1054, etc.

The computing device 1002 includes a network interface 1014 communicatively coupled to network 1016, for communicating to and/or from a portable personal computer, smart phone, electronic document, tablet, and/or desktop personal computer, or other computing devices for communicating overlay maps, predicted tile classifications and locations, predicted cell classifications and locations, etc. Such information may also be stored in a database 1024. The computing device 1002 further includes an I/O interface 1018 connected to devices, such as digital displays 1020 for displaying generator overlay maps, user input devices 1022, etc. A dashboard generator 1026 may be used to generate GUI and/or other digital displays allowing a user to review and interact with and adjust generated overlay maps, prediction classifications, etc.

The functions of the engines may be implemented across distributed computing devices, etc. connected to one another through a communication link. In other examples, functionality of the system may be distributed across any number of devices, including the portable personal computer, smart phone, electronic document, tablet, and desktop personal computer devices shown. The computing device 1002 may be communicatively coupled to the network 1016 and another network. The networks 1016 may be public networks such as the Internet, a private network such as that of a research institution or a corporation, or any combination thereof. Networks can include, local area network (LAN), wide area network (WAN), cellular, satellite, or other network infrastructure, whether wireless or wired. The networks can utilize communications protocols, including packet-based and/or datagram-based protocols such as Internet protocol (IP), transmission control protocol (TCP), user datagram protocol (UDP), or other types of protocols. Moreover, the networks can include a number of devices that facilitate network communications and/or form a hardware basis for the networks, such as switches, routers, gateways, access points (such as a wireless access point as shown), firewalls, base stations, repeaters, backbone devices, etc.

The computer-readable media 1008 may include executable computer-readable code stored thereon for programming a computer (e.g., comprising a processor(s) and GPU(s)) to the techniques herein. Examples of such computer-readable storage media include a hard disk, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. More generally, the processing units of the computing device may represent a CPU-type processing unit, a GPU-type processing unit, a field-programmable gate array (FPGA), another class of digital signal processor (DSP), or other hardware logic components that can be driven by a CPU.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components or multiple components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a microcontroller, field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein can be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method can be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternative embodiments, using either current technology or technology developed after the filing date of this application.

What is claimed is:

1. A method for creating an overlay map on a digital image of a slide, the method comprising:
   receiving the digital image;
   separating the digital image into a plurality of tiles, each tile of the plurality of tiles containing a respective portion of the digital image of the slide; and
   for each tile of the plurality of tiles:
   identifying features of the tile;
   identifying structural tissue features of a second portion of the digital image of the slide including at least part of one or more other tiles of the plurality of tiles, wherein the second portion is larger than the respective portion of the digital image contained in the tile; and
   identifying the majority class of tissue visible within the tile based at least in part on the features of the tile and the structural tissue features of the second portion of the digital image of the slide.

2. The method of claim 1, further comprising:
   generating a digital overlay drawing of an outer edge of each cell in the image.

3. The method of claim 2, wherein the digital overlay drawing is prepared at the resolution level of an individual pixel.

4. The method of claim 1, wherein the majority class of tissue is selected from the group consisting of epithelium, normal epithelium, immune, stroma, necrosis, blood, and fat.

5. The method of claim 1, wherein the structural tissue features comprises at least one of glands, ducts, vessels, and immune clusters.

6. A method for tissue classification of a digital image of a slide, the method comprising:
- receiving the digital image;
- segmenting the digital image into a plurality of tiles, each tile of the plurality of tiles containing a respective portion of the digital image of the slide;
- for each tile of the plurality of tiles:
  - identifying features of the tile;
  - identifying structural tissue features of a second portion of the digital image of the slide including at least part of one or more other tiles of the plurality of tiles, wherein the second portion is larger than the respective portion of the digital image contained in the tile; and
  - determining a predicted class for each tile based at least in part on the features of the tile and the structural tissue features of the second portion of the digital image of the slide;
- identifying a plurality of cell objects in the digital image;
- determining a predicted class for each of the plurality of cell objects; and
- for each of the plurality of tiles that corresponds to one of the plurality of cell objects, assigning the tile the predicted class of the corresponding cell object in place of the predicted class of the tile.

7. The method of claim 6, further comprising:
- storing, in a first file, for each tile, a tile position and the predicted class of the tile; and
- storing, in a second file, for each cell object, a polygon outlining the cell object and the predicted class of the cell object.

8. The method of claim 6, further comprising:
generating a digital overlay drawing for the digital image, where the digital overlay drawing is a cell mask displaying a polygon around each cell object.

9. The method of claim 6, further comprising:
generating a digital overlay drawing for the digital image, where the digital overlay drawing is a histology mask displaying the plurality of tiles and the predict class for each tile.

10. The method of claim 6, further comprising:
- generating a digital overlay drawing for the digital image; and
- displaying, in the digital overlay drawing, the plurality of tiles and the predicted class for each tile that does not correspond to a cell object, and displaying, the plurality of cell objects and the predicted class of each cell object.

11. The method of claim 6, further comprising:
- generating a digital overlay drawing for the digital image, wherein the digital overlay drawing includes the digital image; and
- displaying the digital overlay drawing.

12. The method of claim 6, further comprising:
- generating a digital overlay drawing for the digital image, wherein the digital overlay drawing includes a generated version of the digital image; and
- displaying the digital overlay drawing.

13. The method of claim 6, further comprising:
- generating a plurality of digital overlay drawings for the digital image, where each digital overlay drawing corresponds to a different predicted class; and
- selectively displaying one of the plurality of digital overlay drawings.

14. The method of claim 6, further comprising:
generating a digital overlay drawing for the digital image, where the digital overlay drawing comprises percentages of predict classes corresponding to the digital image.

15. The method of claim 6, further comprising:
generating a digital overlay drawing for the digital image, where the digital overlay drawing comprises total counts of predict classes corresponding to the digital image.

16. The method of claim 6, wherein the cell objects comprise CD3, CD8, CD20, pancytokeratin, and smooth muscle actin.

17. The method of claim 6, wherein the cell objects include lymphocyte cells and not lymphocyte cells.

18. The method of claim 6, wherein the structural tissue features comprises at least one of glands, ducts, vessels, and immune clusters.

* * * * *